United States Patent
Chintapalli et al.

(10) Patent No.: US 11,938,537 B2
(45) Date of Patent: Mar. 26, 2024

(54) SYSTEM AND METHOD FOR HIGH THROUGHPUT ADDITIVE MANUFACTURING OF SINTERED PARTS WITH LOW ANISOTROPY

(71) Applicant: Palo Alto Reseach Center Incorporated, Palo Alto, CA (US)

(72) Inventors: Mahati Chintapalli, Mountain View, CA (US); Sean Garner, Redwood City, CA (US); Ashish Pattekar, Cupertino, CA (US); Anne Plochowietz, Mountain View, CA (US)

(73) Assignee: Xerox Corporation, Norwalk, CT (US)

( * ) Notice: Subject to any disclaimer, the term of this patent is extended or adjusted under 35 U.S.C. 154(b) by 1 day.

(21) Appl. No.: 17/878,538

(22) Filed: Aug. 1, 2022

(65) Prior Publication Data
US 2024/0033823 A1    Feb. 1, 2024

(51) Int. Cl.
| | | |
|---|---|---|
| *B22F 1/10* | (2022.01) | |
| *B22F 10/14* | (2021.01) | |
| *B22F 10/66* | (2021.01) | |
| *B22F 12/50* | (2021.01) | |
| *B22F 12/86* | (2021.01) | |
| *B29C 64/147* | (2017.01) | |
| *B29C 64/165* | (2017.01) | |
| *B33Y 10/00* | (2015.01) | |

(Continued)

(52) U.S. Cl.
CPC ............... *B22F 10/14* (2021.01); *B22F 1/10* (2022.01); *B22F 10/66* (2021.01); *B22F 12/50* (2021.01); *B22F 12/86* (2021.01); *B29C 64/147* (2017.08); *B33Y 10/00* (2014.12); *B33Y 40/20* (2020.01); *B33Y 70/10* (2020.01); *B29C 64/165* (2017.08); *B41J 2/01* (2013.01)

(58) Field of Classification Search
CPC .. B22F 10/14; B22F 1/10; B22F 10/66; B22F 12/50; B22F 12/86; B33Y 10/00; B33Y 40/20; B33Y 70/10; B29C 64/147; B29C 64/165; B41J 2/01
See application file for complete search history.

(56) References Cited

U.S. PATENT DOCUMENTS

| | | |
|---|---|---|
| 9,073,259 B2 | 7/2015 | Dufort et al. |
| 10,046,552 B2 | 8/2018 | Swartz et al. |

(Continued)

OTHER PUBLICATIONS

Weisensel et al., "Advanced Laminted Object Manufacturing (LOM) of SiSiC Ceramics", 15th Solid Freedom Fabrication Symposium, Austin TX (2004).

*Primary Examiner* — Rebecca Janssen
(74) *Attorney, Agent, or Firm* — Caesar Rivise, PC

(57) ABSTRACT

A 3D printing system and methods to selectively pattern dense feedstock based on selective inhibition sintering (SIS). A sintering selectivity agent (inhibitor or promoter) is selectively deposited on a build layer according to the pattern boundary. When the layers are built-up and the part is sintered, the inhibited region remains unbound, thus defining the edge of the part. The material contain powder embedded in cohesive binder that make the adjacent layer adhere together. The build process involves forming the sheets of dense feedstock embedded binder, followed by depositing ink to promote selective sintering onto the layer. Once the build is complete, the process continues with the binder removal, sintering and finishing processes.

22 Claims, 8 Drawing Sheets

(51) Int. Cl.
*B33Y 40/20* (2020.01)
*B33Y 70/10* (2020.01)
*B41J 2/01* (2006.01)

(56) References Cited

U.S. PATENT DOCUMENTS

| | | |
|---|---|---|
| 10,252,487 B2 | 4/2019 | Swartz |
| 2008/0210122 A1* | 9/2008 | Magdassi ............... C09D 11/30 523/160 |
| 2017/0291223 A1 | 10/2017 | Swartz et al. |
| 2018/0085996 A1* | 3/2018 | Beier ................. G03G 15/1625 |
| 2020/0207015 A1 | 7/2020 | Pattekar et al. |
| 2022/0127200 A1 | 4/2022 | Chintapalli et al. |
| 2022/0143695 A1 | 5/2022 | Chintapalli et al. |

* cited by examiner

SYSTEM AND METHOD FOR HIGH THROUGHPUT ADDITIVE MANUFACTURING OF SINTERED PARTS WITH LOW ANISOTROPY

FIELD OF DISCLOSURE

This disclosure relates generally to systems and methods for additive manufacturing, and more particularly, to systems and methods for high throughput additive manufacturing of sintered parts with low anisotropy.

BACKGROUND

Traditional object, part and component manufacturing processes, which generally included varying forms of molding or machining of output products, have expanded to include commercial implementations of a new class of techniques globally referred to as "additive manufacturing" or AM techniques. These AM techniques generally involve processes, alternatively referred to as "Solid Freeform Fabrication (SFF)" or "3D printing" in which layers of additive materials, sometimes toxic or otherwise hazardous in an unfinished state are sequentially deposited on an in-process 3D object according to a particular material deposition and curing scheme. As each layer is added in the 3D object forming process, the new layer of material is added and adhered to the one or more already existing layers. Each AM layer may then be individually cured, at least partially, prior to deposition of any next AM layer in the 3D object build process. This sequential-layer material addition/joining throughout a 3D work envelope is executed under automated control of varying levels of sophistication.

AM manufacturing techniques include, but are not limited to, those techniques that have come to be referred to broadly as "3D printing" techniques usable for producing 3D printed objects. 3D printing techniques employ one or more processes that are adapted from, and appear in some respects to be similar to, well-known processes for forming two-dimensional (2D) printed images on image receiving media substrates. Significant differences in the output structures produced by the 3D printing techniques are generally based on (1) a composition of the deposited materials that are used to form the output 3D printed objects from the 3D printer; and/or (2) a number of passes made by the "print" heads in depositing comparatively large numbers of successive (and very thin) layers of the deposition material to build up the layers to the form of the output 3D printed objects.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a method for selectively patterning a dense sinterable additive manufactured feedstock structure into a 3D part via selective promotion of sintering with a 3D printing system. The exemplary method includes forwarding a web sheet having a layer of dense feedstock in a process direction with a transfer subsystem of a printing system, the feedstock being a dense sinterable material and binder composite with porosity below 20% volume, the web sheet sectioned into dense feedstock 3D slices having slice boundary sections therebetween, the slices having an imaging area thereon; selectively depositing a sintering ink according to a 3D pattern onto the imaging area of one of the dense feedstock 3D slices, the sintering ink infiltrating into the dense feedstock 3D slices to form patterned dense feedstock slices in accordance with the 3D pattern; stacking the patterned dense feedstock slices over a previously formed patterned dense feedstock slice to form a build monolith having a plurality of patterned dense feedstock slices; removing binder from the build monolith, may be via one of solvent debind and thermal debind; and sintering the build monolith into the 3D part shaped based on the 3D pattern.

According to aspects illustrated herein, another exemplary method for selectively patterning a dense sinterable additive manufactured feedstock structure into a 3D part via selective promotion of sintering with a 3D printing system. The exemplary method includes forwarding a web sheet having a layer of dense feedstock in a process direction with a transfer subsystem of a printing system, the feedstock being a dense sinterable material and binder composite with porosity below 20% volume, the layer of dense feedstock being a dense feedstock 3D slice having imaging areas thereon; selectively depositing a sintering ink according to a 3D pattern onto the imaging areas of the dense feedstock 3D slice, the sintering ink infiltrating into the dense feedstock 3D slice to form a patterned dense feedstock slice in accordance with the 3D pattern; winding the patterned dense feedstock slice over a previously formed patterned dense feedstock slice section to form a build monolith; removing binder from the build monolith, may be via one of solvent debind and thermal debind; and sintering the build monolith into the 3D part shaped based on the 3D pattern.

According to aspects described herein, yet another exemplary method for selectively patterning a dense sinterable additive manufactured feedstock structure into a 3D part via selective promotion of sintering with a 3D printing system includes forwarding a plurality of web sheets including a plurality of dense feedstock 3D slices in a process direction with a transfer subsystem of a printing system, the 3D slices including feedstock having a dense sinterable material and binder composite with porosity below 20% volume, the 3D slices having an imaging area thereon; selectively depositing a sintering ink according to a 3D pattern onto the imaging area of the dense feedstock 3D slices, the sintering ink infiltrating into the dense feedstock 3D slices to form patterned dense feedstock slices in accordance with the 3D pattern; stacking the patterned dense feedstock slices over a previously formed patterned dense feedstock slice to form a build monolith of the patterned dense feedstock slices; removing binder from the build monolith, may be via one of solvent debind and thermal debind; and sintering the build monolith into the 3D part shaped based on the 3D pattern.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
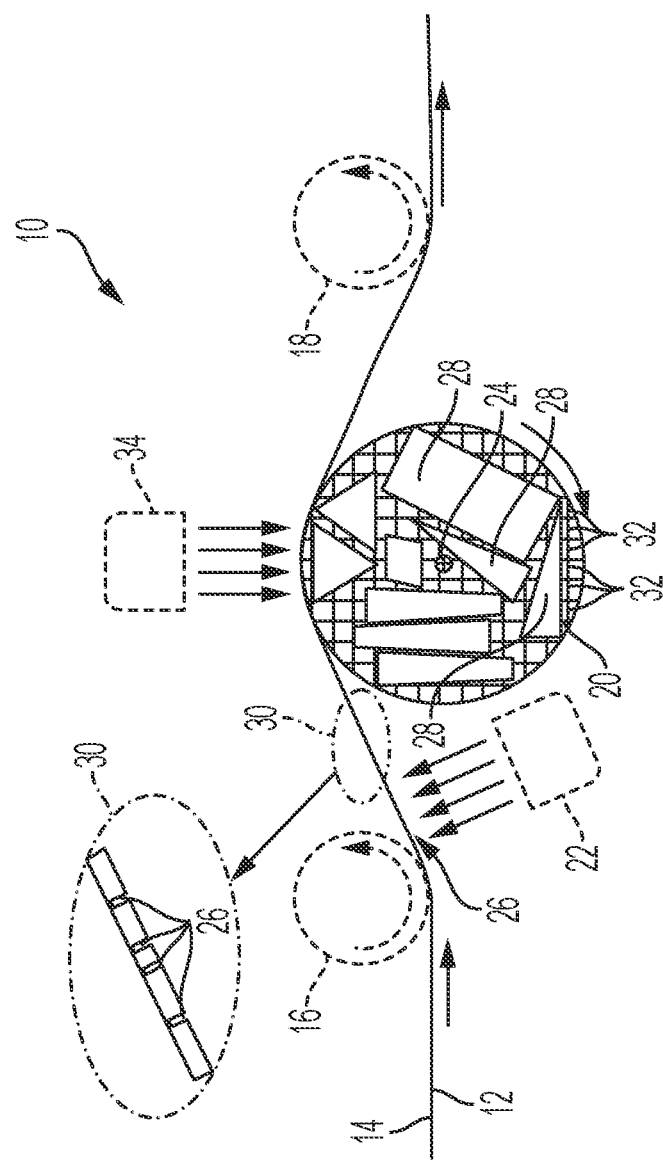
FIG. 1 is a side view of an exemplary related art ETHAL 3D printing system for printing 3D objects in accordance with an example of the embodiments.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for AM manufacturing.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The terms "media", "web", "web substrate", "print substrate" and "substrate sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, non-woven fabrics, metal films, carbon fiber reinforced material and foils, as readily understood by a skilled artisan. In additive manufacturing, a sheet may refer to a slice of a 3D object that is self-supporting or has a backing substrate that may be removed before a next sheet is added to a 3D object build.

The term "ink" as used herein may refer to printing matter deposited by an image forming device onto a web sheet or central rod supported cylinder to form an image on the sheet or cylinder. The listed term "ink" may include a sintering selectivity agent that is one of a sintering inhibitor to be deposited on the negative space or boundary of the pattern, and a sintering promoter to be deposited in the positive space of the pattern. Sintering ink may include an agent to deactivate the inhibitor, which may be placed throughout the bulk of the feedstock. The sintering ink may include a sintering inhibitor or a chemical that is a precursor to a sintering inhibitor.

The term 'printing system", "printing device" or "printer" as used herein encompasses any apparatus that performs a print outputting function for any purpose, such as a digital copier, scanner, image printing machine, xerographic device, digital production press, document processing system, image reproduction machine, bookmaking machine, facsimile machine, multi-function machine, 3D printer or the like and can include several marking engines, feed mechanism, scanning assembly as well as other print media processing units, such as paper feeders, finishers, and the like. A printing system can handle sheets, webs, marking materials, 3D feedstock and the like. A 3D printer can make a 3D object, and the like. A 3D printer may also be used to manufacture 2D, sheet-like, or surface-like objects. It will be understood that the structures depicted in the figures may include additional features not depicted for simplicity, while depicted structures may be removed or modified.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The examples further include at least one machine-readable medium comprising a plurality of instructions, when executed on a computing device, to implement or perform a method as disclosed herein. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

As used herein, unless otherwise specified, the term "object" can also mean part, element, piece, or component in whole or a portion thereof. As used herein, an object refers to a 3D object to be individually built, or actually built, by a 3D printing system (printer). An object, as referred herein, may be built by successively adding layers so as to form an integral piece, or by continuously adding to a turning spiraled layer forming an outwardly growing cylinder. Some printers are capable of building, as part of the same print job, a plurality of independent pieces from a 3D model including a plurality of independent 3D objects. An object may include void spaces embedded in the object body.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

State of the art 3D printing (3DP) techniques such as Selective Laser Sintering (SLS), Stereolithography (SLA), Solid-Ground Curing (SGC), Multi-Jet Fusion (MJF), and Laminated Object Manufacturing (LOM) rely on a layer-by-layer 'additive' approach, wherein a part with the desired 3-dimensional geometry is created from the material to be 3D printed (hereinafter "active material" or "active 3D printing material" or "active material to be 3D printed") by repeatedly developing 2-dimensional patterns (in the form of individual layers typically less than 100-500 micrometers thick) that are successively added on top of each—other thereby 'building up' the desired part. Other 3DP/AM techniques such as Fused Deposition Modeling (FDM) and Laser Engineered Net Shaping (LENS) rely on creating a 1-dimensional (line) pattern that is written into a 2D (X-Y) layer and the desired 3D geometry is realized by continually "building up" the X-Y layers in the vertical (Z) direction. In many 3DP/AM techniques, a sacrificial material (hereinafter "support material" or "supporting material") may be added for each layer where the active 3D printing material was not deposited (to fill in the open areas/voids in the 2D pattern), before starting the subsequent (overlaid in the Z direction) layer so that overhangs in successive layers may b e reliably deposited and supported on top of the underlying layers and the desired 3D printed parts may be temporarily supported within the build volume, till they are released from the 3D printing stage for post-processing (if needed) and subsequent use in the desired application, for which they are being produced.

Laminated object manufacturing (LOM) is a method of high-speed additive manufacturing that can be used with sheet-like feedstocks incorporating a variety of materials including metals. In conventional LOM, the feedstock is formed into sheets that are cut out into cross sections of the designed part, and the sheets are laminated or fused together. Because the feedstock is 2D, in principle, printer design can be simplified by leveraging techniques from conventional paper printing. LOM techniques are compatible with high-speed additive manufacturing because the material is already fused in the plane of the cross section; patterning only needs to occur at the perimeter of the cross-section.

LOM processes compatible with sinterable feedstocks include depositing an adhesive or binder over the cross section of the layer, or cutting a layer at the perimeter of the cross section. In an adhesive process, the adhesive can be applied to a pre-formed sheet substrate containing the powder feedstock (i.e., powder embedded in a binder or on a porous substrate), or loose powder can be applied to the adhesive. Both the adhesive and cutting approaches have limitations. Printing an adhesive or binder over the cross section of a part is fundamentally slower than printing just at the boundaries. In addition, using an adhesive in addition to a feedstock substrate creates different powder density in-plane and through-plane, leading to part anisotropy. In other words, parts made from LOM are anisotropic and have weak shear planes between layers. Further, having two inactive materials (adhesive and substrate) complicates the binder removal step prior to sintering. Moreover, cutting a layer away at the perimeter limits part geometries to shapes with small overhangs and no floating planes.

Accordingly, as will be further appreciated, it may be useful to provide an Embedded High-speed Turning for Additive Layering (EHTAL) 3D printing system to allow significantly higher speed 3D printing of Additively Manufactured/3D printed parts. The EHTAL 3D printing system may include a continuously revolving roller on to which the patterned layer and any supporting material may be continuously added without having to resort to a back-and-forth or stop-and-go process. For example, the present techniques may include continuously adding on a layer in a concentric, spiral manner, and constructing to extend outwardly (e.g., "building out") the diameter of the rotating cylinder from a starting central core. By continuously adding (e.g., material deposition to cover the pattern in the immediately preceding layer) and patterning active and support materials onto the surface of such a growing cylinder, it would be possible to fabricate the desired shapes (e.g., various 3D printed shapes/parts) embedded within the support material. In this way, the 3D printed part(s) may be thus constructed to "grow" layer by layer in a continuous spiraled manner, without having the "stop-and-go" methodology and constant layer deposition step direction change due to the back-and-forth motion of the development (layer patterning) system. Thus, so long as the outwardly growing cylinder keeps turning and patterned active and support materials are added in a continuous fashion to support the outward growth of the turning cylinder, the desired 3D Printed/Additively Manufactured components (parts) embedded within the support material can be fabricated at a high speed in a continuous fashion without having to stop the patterning process after each layer as is done in state of the art layered 3D printing/Additive Manufacturing systems—thereby significantly reducing process time and improving the overall 3D printing speed and 3D printing/fabrication throughput as well as enhancing overall system reliability. Moreover, the continuous spiral deposition on the outer curved surface of the outwardly growing cylinder does not result in the flat planes of weakness described above, and therefore can minimize fracture or slippage planes in the resulting 3DP/AM parts because the continuously deposited curved layers within the rotating cylinder provide improved structural stability.

In accordance with the present embodiments, it may be useful to describe EHTAL 3D printing systems, which are discussed in greater detail in U.S. Patent Publication No. US20200207015 to Pattekar et al. FIG. 1 is a diagram of an exemplary related art ETHAL 3D printing system 10 that may fabricate one or more 3DP/AM parts by using a sequential, pattern-wise deposition of anti-sintering agents (e.g., de-binding agents). In particular, the 3D printing system includes an active 3DP material that may be deposited (e.g., via a roller, spray, slit in a trough) as layer 12 onto a continuously revolving cylinder 20 via a carrier belt or ribbon 14, which may be referred to as a transfer belt. Specifically, a layer including the patterned active 3DP material layer 12 may be continuously deposited on the surface of the carrier ribbon 14, as the layer moves along with the ribbon. The active 3DP material layer 12 may be a metal or plastic powder, Metal Injection Molding (MIM) starting material including a polydisperse metal powder and polymer binder, or other suitable material that is to be patterned into a 3D part to be fabricated in the desired geometry. Active materials for dense feedstock may include stainless steel alloys such as 17-4PH, carbonyl iron, 316, magnetic alloys, copper-nickel alloys, titanium, copper, alumina, zirconia, aluminosilicate minerals and glasses, polymer particles, and many others including various metals, metal alloys, ceramics, and plastics/polymers.

In examples, binder for the dense feedstock may be hydrophobic or hydrophilic, and it may contain thermoplastic or thermoset components. Some active binder materials include: polyethylene, polypropylene, polyoxymethylene, paraffin, carnauba wax, polypropylene oxide, polybutylene oxide (hydrophobic thermoplastics); polyethylene oxide, polypropylene carbonate, polybutylene carbonate, alginate, agar, cellulose, methylcellulose, methylcellulose-based compounds, solidum lignosulfonate, polyvinyl alcohol, polyvinyl butyral, polyacrylate salts, polylactic acid, (hydrophilic thermoplastics), and hydrophobic or hydrophilic UV-curable acrylate and methacrylate resins (thermosets).

Binders may include additional components such as surfactants to promote adhesion with the sinterable components (stearic acid, oleic acid, oleyl amine, fish oil, Pluronic surfactants, block copolymers of polyethylene oxide and polypropylene oxide, sodium dodecyl sulfate, molecules containing a hydrophobic moiety and a hydrophilic moiety such as a phosphate, sulfate, ammonium, carboxylates, or other amphiphilic molecules). Binders may include viscosity modifiers such as oligomers (short chain polymers) of the polymers listed above, glycerin, phthalate-containing molecules, dibutyl phthalate, dioctyl phthalate or solvents such as water, or organic solvents, such as toluene, xylenes, alkanes, decane, hexane, isopar, n-methylpyrrolidone, dimethylformamide, tetrahydrofuran, dimethylsulfoxide, acetophenone, and others.

The 3D printing system 10 further includes the carrier ribbon 14, a first roller 16, a second roller 18, the cylinder 20, an anti-sintering/de-binding agent jetting subsystem 22, and a transfer component 34 that transfers the active material 12 being 3D printed along with any embedded patterned anti-sintering/de-binding agent(s) 26, on to the outwardly growing cylinder. The cylinder 20 may include various 3D printed parts 28 which are illustrated by the exemplary shapes (e.g., the triangles, rectangles, trapezoids, parallelograms, etc.) within the cylinder.

As the rollers 16 and 18 rotate counterclockwise, the carrier ribbon 14 may move towards the right as shown in FIG. 1. The anti-sintering jetting subsystem 22 is a selective inhibition sintering mechanism that may spray, shoot, deposit, or otherwise apply a support material (e.g., anti-sintering agent 26) to the active material 12 that is on the surface of the carrier ribbon 14. The transfer component 34 may apply heat, light, mechanical vibration, or pressure at the contact between the ribbon 14 and the cylinder 20 to enable transfer of the active material 12 with the embedded patterned support material (e.g., anti-sintering agent 26) on to the surface of continuously rotating and outwardly growing spiraled cylinder. The cylinder 20 includes a core 24. Initially, the active material 12 with the embedded patterned anti-sintering agent 26 may be transferred to the core 24 and later onto the outer surface of the cylinder 20 as the cylinder is built. The core 24 may be attached to a rotating system (e.g., a rotating support axle, a motor that rotates the core), for example as discussed above.

The anti-sintering jetting subsystem 22 may perform a pattern-wise deposition of the anti-sintering agent 26 on to the active material layer 12 on ribbon 14. As illustrated in portion 30 of the active material layer 12, the anti-sintering agent 26 may be deposited (e.g., sprayed) onto the active material layer to form a pattern. The anti-sintering agent 26 is an ink that would impede the formation of permanent bond between the particles/components comprising the active material 12 that is being 3D printed in this system. Once the deposition of the patterned anti-sintering material and the active material being 3D printed is completed, the cylinder 20 may be cured, for example, by heating in an activation heater 38 (e.g., furnace, oven) to an appropriate sintering temperature (e.g., greater than about 400° C. for metal particles and 800° C. for ceramic particles). The activation heater 38 may include heating elements to achieve the target heating temperature for effective sintering, such as electrical (resistive) heating elements, combustible gas (burner) heating elements, or microwave/infrared or other (radiative) heating elements. Other curing approaches that may be used include mechanical (e.g., mechanical compaction/pressure application), chemical (e.g., chemical reactions leading to formation of permanent bonds between the constituents of the active material) and/or optical means (e.g., using lasers or directed infrared/ultraviolet light in order to cure/fuse the constituents of the active material).

The embedded anti-sintering agent 26 in cylinder 20 may form cut lines (e.g., de-binding borders 32) which act as separation points/de-binding boundaries upon sintering/curing of cylinder. After the curing/sintering step (e.g., by heating in a furnace or other suitable curing treatment to enable sintering/curing of cylinder 20), the anti-sintering agent patterned into cylinder would cause the formation of well-defined 3D printed geometrical shaped parts by forming appropriate de-binding boundaries 32 between contiguous regions inside the cylinder 20. This may occur by a mechanism of the formation, e.g., of a weak or porous solid, such as by the dehydration and solidification of applied sol-gel slurry to a brittle ceramic solid that may disintegrate into a powder and naturally fall away from the 3D printed parts 28 along the de-binding boundaries defined by the patterned anti-sintering agent 26. The de-binding or anti-sintering agents/materials for the related art 3D printed parts may include an applied polymeric material (e.g., Polyalkylenecarbonates) that may decompose or degrade with the application of heat, or by other chemical means. This would produce gap/break-away de-binding borders 32 between the build and support structures and may also produce additional break-away borders within the support structures to promote ease of separation within the revolving cylinder 20. Other related art anti-sintering material may include, but are not limited to, a suspension of particles that includes a sol-gel slurry of silicon alkoxide/hydroxide, aluminum alkoxide/hydroxide, or metal alkoxide or hydroxide, a resin (e.g., a synthetic resin, epoxy resin) a polymeric/metal mixture, a polymeric/ceramic mixture and a polymeric/inorganic mixture, a dissolvable or dehydratable inorganic salt solution or slurry, of which at least one component of the solution or slurry may undergo degradation or decomposition with the application of at least one of heat, light, and/or a chemical agent.

In some related art examples, combinations of ceramic slurry, ceramic particles, and polymeric solutions may also be used as the de-binding agent. A solution or slurry of a metal halide or other non-reacting salt may be used as a de-binding agent, where upon dehydration or exposure to an appropriate solvent (e.g., water), the salt crystals remaining will fall away or dissolve to separate the 3D printed parts 28 and surrounding support structure. Once the revolving cylinder 20 with embedded 3D printed parts 28 is formed, the cylinder rotation may be stopped and the pre-sintering stage parts, for example, may be separated first and sintered in a furnace subsequently. In other examples, the entire cylinder 20 may be sintered in the furnace and the support structures may be removed thereafter by a variety of means, including but not limited to mechanical separation, chemically etching or dissolving the boundary between the parts of interest and support material, melting away the support material, ablating away the support material using optical (e.g., laser or directed infrared/ultraviolet light), etc.

The carrier ribbon 14, the rotation system for rotating the cylinder 20, the roller 16, the roller 18, the anti-sintering jetting subsystem 22, and the transfer component 34 may all be controlled by a control system/subsystem. For example, a computing device may synchronize the operation (e.g., the speed of rotation) of the carrier ribbon 14, the rotation system for rotating the cylinder 20, the roller 16, the roller 18, the anti-sintering jetting subsystem 22, and the transfer component 34, as understood by a skilled artisan.

Figure 2:
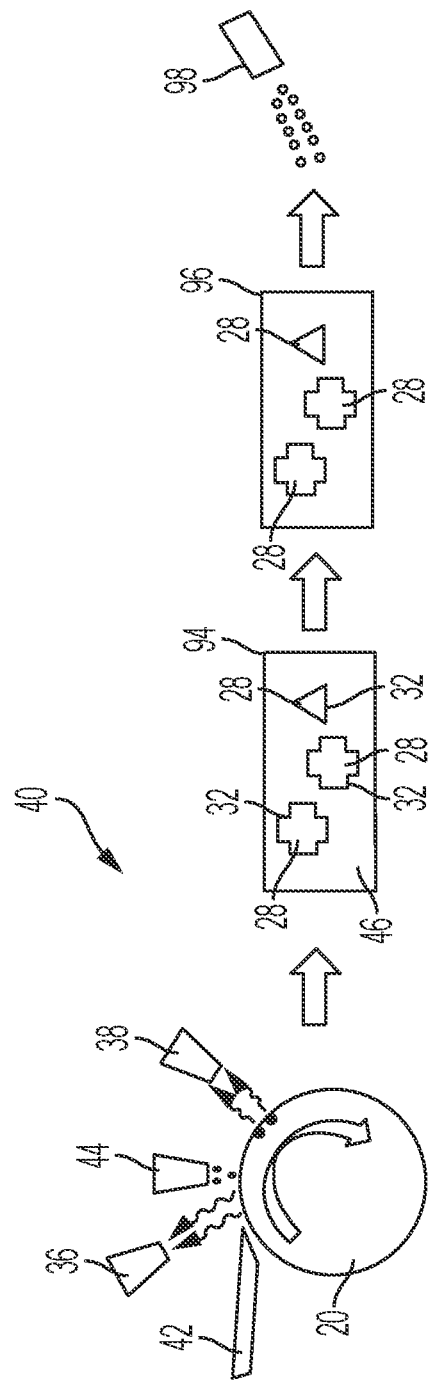
FIG. 2 is a side view of another related art EHTAL 3D printing system that may fabricate 3D objects in accordance with an example of the embodiments.

FIG. 2 is a diagram of another EHTAL 3D printing system 40 that may fabricate one or more 3D parts by using a sequential deposition of the active material 12 being 3D printed and pattern-wise deposition of appropriate anti-sintering agents 26 (e.g., de-binding agents). The 3D printing system 40 includes an active material deposition subsystem 42, an anti-sintering agent deposition subsystem 44, and a cylinder 20. The cylinder 20 includes various 3D printed parts 28 which are illustrated by the shapes (e.g., the triangles, rectangles, trapezoids, parallelograms, etc.) within the cylinder.

The active material deposition system 42 may deposit (e.g., spray, shoot, deposit, extrude or otherwise mechanically apply) the active material 12 to be 3D printed onto the cylinder 20 to the surface (e.g., the outer surface) of the cylinder. The active material may comprise, e.g., an ultraviolet (UV) curable resin, or a slurry containing ceramic or metal/metal alloy particles, or a metal injection molding [MUM] slurry containing a mixture of polydisperse metal/metal alloy/ceramic powder & polymer binder. The dense feedstock layer may be subject to a fixing action, for example by a viscosity modifier 36 to transform the feedstock from a state which is easy to apply as layer to a state where the feedstock forms a solid or semi-solid self-supporting structure. The fixing can facilitate thinner layers to be applied (e.g., <100 microns, <50 microns, <10 microns), which may result in higher resolution parts. Examples of a viscosity modifier 36 include a heater drying solvent out of the feedstock to go from a low viscosity liquid to a dry, dense, solid powder-binder composite; a UV heater UV-curing a feedstock containing a UV-curable liquid binder resin; and after applying the feedstock as a liquid at or above room temperature, a cooler to form a solid at room temperature or below, as understood by a skilled artisan.

The anti-sintering agent deposition subsystem 44 (e.g., ink jet with nozzles, spray, etc), which is also a selective inhibition sintering mechanism that may also be referred to as the anti-sintering/de-binding agent jetting subsystem 22, may perform a pattern-wise deposition of an anti-sintering agent 26. For example, the subsystem 44 may spray the anti-sintering agent 26 onto the active material 12 in a pattern (e.g., a 2D pattern or shape) on the outer surface of the continuously rotating and outwardly growing cylinder. The anti-sintering jetting subsystem 22 may thus create an anti-sintering agent pattern on to the active material 12 that is continuously deposited on the surface of the cylinder 20 as the cylinder rotates in a continuous fashion (e.g., clockwise in FIG. 2). The active material 12 and the anti-sintering agent may be applied to the cylinder 20 sequentially. For example, the active material 12 may be applied or deposited onto the cylinder 20 first by the subsystem 42, and the anti-sintering agent 26 may be applied or deposited onto the cylinder thereafter by the anti-sintering jetting subsystem/print-head 22 as the cylinder rotates in a continuous, clockwise fashion, as indicated by the arrow in FIG. 2

The anti-sintering agent 26 may be applied to the active material to define boundaries between contiguous cured zones in the cylinder 20. The boundaries may be or may define de-binding regions that allow the 3D printed parts 28 to be separated from each other or separated from the rest of the material in the cylinder 20 (e.g., the active material that fills the space between the 3D printed parts 28). The anti-sintering agent, which is deposited onto the surface of the cylinder 20 as it turns and grows outwardly, may be composed of any material that, upon the application of heat (or other suitable physical/chemical mechanism) to sinter the 3D printed parts 28, may provide a de-binding/separation boundary 32 between the 3D printed parts and support material 46. This may occur by a mechanism of the formation of a weak or porous solid, such as by the dehydration and solidification of applied sol-gel slurry to a brittle ceramic solid that may dissolve into a powder and naturally fall away from the 3D printed parts 28.

In other words, during any time between ink deposition by the anti-sintering agent deposition subsystem 44 and early stages of sintering, the anti-sintering/de-binding agent 26 can undergo an optional activation process. For example, if the ink is a salt that is soluble when printed, it can be precipitated out by evaporating the solvent from the ink, and then thermally decomposed via a heater 38 (FIG. 2 (e.g., via a heater, heating element, laser, diode, oven)) into a ceramic particle as understood by a skilled artisan. Other anti-sintering ink materials may include an applied polymeric material (e.g., Poly-alkylenecarbonates) that may decompose or degrade with the application of heat, or by other chemical means. This would produce a boundary 32 to aid the separation of the 3D printed parts 28 and support structures 46 within the cylinder 20. The cylinder includes a core 24 (e.g., a starting core, a central core, a starting central core, etc.). Initially, the active material 12 may be transferred to the core 24 and later onto the outer surface of the cylinder as the cylinder is built, grown diametrically outward (i.e., grown by increasing the diameter spirally), etc. The core 24 may be attached to a rotating system (e.g., a rotating support axle, a motor that rotates the core, etc.).

As the active material 12 is continuously deposited on to the surface of the rotating and outwardly growing cylinder 20, the subsystems 42 and 44 may be continuously moved (translated) away from the axis of the rotating cylinder as its radius increases, so as to maintain an optimal distance (typically less than 10 millimeters) between the subsystems 42, 44 and the outer surface of cylinder in order to ensure reliable deposition of the active material and anti-sintering agents. In examples, the cylinder 20 may be translated rather than or in addition to subsystems 42 and 44. The relative spacing between subsystem 42 and 44 versus the build surface may also be maintained as understood by a skilled artisan. Moreover, the rotational speed of the cylinder 20 (e.g., number of revolutions per minute or RPM) may be continuously adjusted to maintain a fixed linear speed of the outer surface in order to maintain optimal deposition conditions for subsystems 42 and 44. In another example, the rotational speed of cylinder 20 may be kept fixed (i.e., not adjusted as above) and the print/deposition rate from subsystems 42 and 44 may be adjusted to track the speed of motion of the outer curved surface of the growing & continuously rotating cylinder.

In some related art examples, combinations of ceramic slurry, ceramic particles, and polymeric solutions may be used as the de-binding agent. A solution or slurry of a metal halide or other non-reacting salt may be used as a de-binding agent, where upon dehydration or exposure to an appropriate solvent (e.g., water) or other chemical, the salt crystals remaining will fall away or dissolve to separate the 3D printed parts 28 (with boundaries defined by the patterned anti-sintering agent from subsystem 44 and surrounding support structure. Once the revolving cylinder 20 with all the desired embedded 3D printed parts 28 is formed, the rotation of the cylinder may be stopped, and the pre-sintering stage parts may be separated along the boundaries 32 defined by the patterned de-binding agent, and subsequently sintered in a furnace. In another example, the entire cylinder 20 may be removed from the system and sintered in the furnace, or the rotation may be stopped and the cylinder may be sintered in-situ. The support structures of material 46 may be removed thereafter by a variety of approaches, including but not limited to mechanical separation, chemically etching or dissolving the boundary between the parts of interest and support material, melting away the support material, using optical means (e.g., laser/focused infrared or UV light, etc.). As illustrated in FIG. 2, the individual 3D parts 28 may be removed from the cylinder 20 by separating the parts from the cylinder along boundaries 32 formed by the patterned anti-sintering agents deposited in the cylinder during the above-described fabrication process.

The rotation system for rotating the cylinder 20, viscosity modifier 36, activation heater 38, the subsystems 42 and 44, etc., may all be controlled by a control system/subsystem. For example, a computing device may synchronize the operation of the rotating system and the subsystems 42 and 44.

Sinterable feedstocks currently used in 3DP are typically either loose powder, or are deposited selectively from a bound filament or feedstock (e.g., fused deposition modeling (FDM) or extrusion printing). Porous feedstocks or loose powders are not suitable for the EHTAL approach discussed above because they cannot be layered in an unsupported build architecture. FDM-type processes are not suitable for EHTAL because with high density ceramic or metal feedstocks, the angular momentum of the cylinder 20 would change with build geometry, making the rotational control system more complicated and limiting the maximum rotational speed to the FDM-type material deposition processes, which are inherently slow. In addition, FDM processes typically result in parts with relatively low resolution due to the large extrusion head (nozzle) opening required to enable reasonable material flow rates, and they require a separate support material to generate overhangs. EHTAL has the potential to be high resolution, and would not require separate support material, though it does not preclude the use of a support material.

The improvements described herein are considered new and different because the improvements enable the continuous 3D printing of metal and ceramic parts in a cylindrical geometry, by enabling selective sintering of dense, cohesive feedstocks. Previous methods for using additive manufacturing to generate metal or ceramic parts rely on SLS (selective laser sintering) or FDM processes in an XY-Z geometry, and the materials requirements for such processes are different from the EHTAL approach. While selective sintering of loose, powder feedstocks and mechanisms of selectivity are generally known in the art, but these teachings are not applicable to dense feedstocks (e.g., dense sinterable material and binder composite with porosity below about 20% volume).

SLS processes for XY-Z 3D printing include positive or negative patterning. In SLS with positive patterning, a powder layer is selectively compacted, formed into a dense, cohesive green layer, or directly sintered into a dense part. In SLS with negative patterning, a sintering inhibitor is deposited at the boundary or in the negative space of a pattern, or the powder is compacted/bound/solidified at the boundary to form a solid enclosing volume for the loose powder to be sintered. One form of negative-patterned SLS is selective inhibition sintering (SIS). Sintering may take place layer-by-layer, or the part may be separated from the build prior to sintering, and subsequently sintered as a whole. In all of these XY-Z SLS processes, the feedstock is a powder, either pure or a mixture of powdered active materials and powdered binder. XY-Z processes are fundamentally limited in speed compared to EHTAL because the print development system must decelerate to reverse direction at the beginning and end of each layer.

For EHTAL, none of these previous SLS approaches are suitable because a dense, self-supporting feedstock is required. Selective patterning of sintering on a dense feedstock is more complicated than on a powder because the positive and negative parts of the build are embedded in a single monolith, and it's harder to infiltrate an ink into a dense layer. In addition, there are material compatibility challenges discussed in the previous section (hydrophilic inks+hydrophobic binders). This invention overcomes these intrinsic challenges to enable selective patterning of dense, self-supporting feedstocks.

Selective patterning of dense feedstocks can have additional benefits other than enabling EHTAL: the patterned monolith can be machined using secondary processes such as die-molding or traditional subtractive manufacturing. The patterning ink can carry precursors for additional types of material giving rise to structurally complex, multi-material and composite parts. These advantages apply both in cylindrical geometry printing and in XY-Z printing.

Examples modify the related art to operate with materials and processes to enable 3D printing of sinterable, cohesive, dense feedstocks selectively patterned by a selective inhibition sintering mechanism. The materials disclosed are applicable to EHTAL or other forms of 3D printing including conventional stacked XY-Z printing. In certain examples, a sintering inhibitor is selectively deposited as an ink (e.g., sintering ink) on a build layer at boundaries of a positive space pattern, or in the negative space around the positive space pattern. When the layers are built up and the part is sintered, the inhibited regions remain unbound, defining edges of the 3D printed parts. Selective inhibition sintering may be demonstrated with loose powders, but there are inherent challenges using selective inhibition sintering with self-supporting, dense feedstocks that contain binder, and this process has never been demonstrated before with dense feedstocks containing binder, such as with the feedstock being a dense sinterable material and binder composite with porosity below 20% volume.

Components of the inhibiting ink and feedstock binder are carefully chosen to ensure that the build cylinder has sufficient green strength (i.e., strength of the part as printed before sintering). The inhibiting ink may carry the inhibiting agent(s) into the dense feedstock build layer, which is thin, pinhole-free and can be deposited rapidly. Selection of materials for 3D printing of sinterable, cohesive, dense feedstocks is non-obvious in view of well-known 3D printing because typical sintering inhibitors are ionic species such as metal salts or acids, while typical sinterable feedstocks with high green strength use hydrophobic binders. Selecting a binder-ink system where ink can easily penetrate the build layer is also non-trivial. Either the ink must be capable of simultaneously solvating both ionic and hydrophobic species, or the feedstock needs to be formulated with a strong, hydrophilic binder with appropriate viscoelastic properties for layer deposition. Examples herein describe materials for these two broad classes of embodiments (and others).

Figure 3:
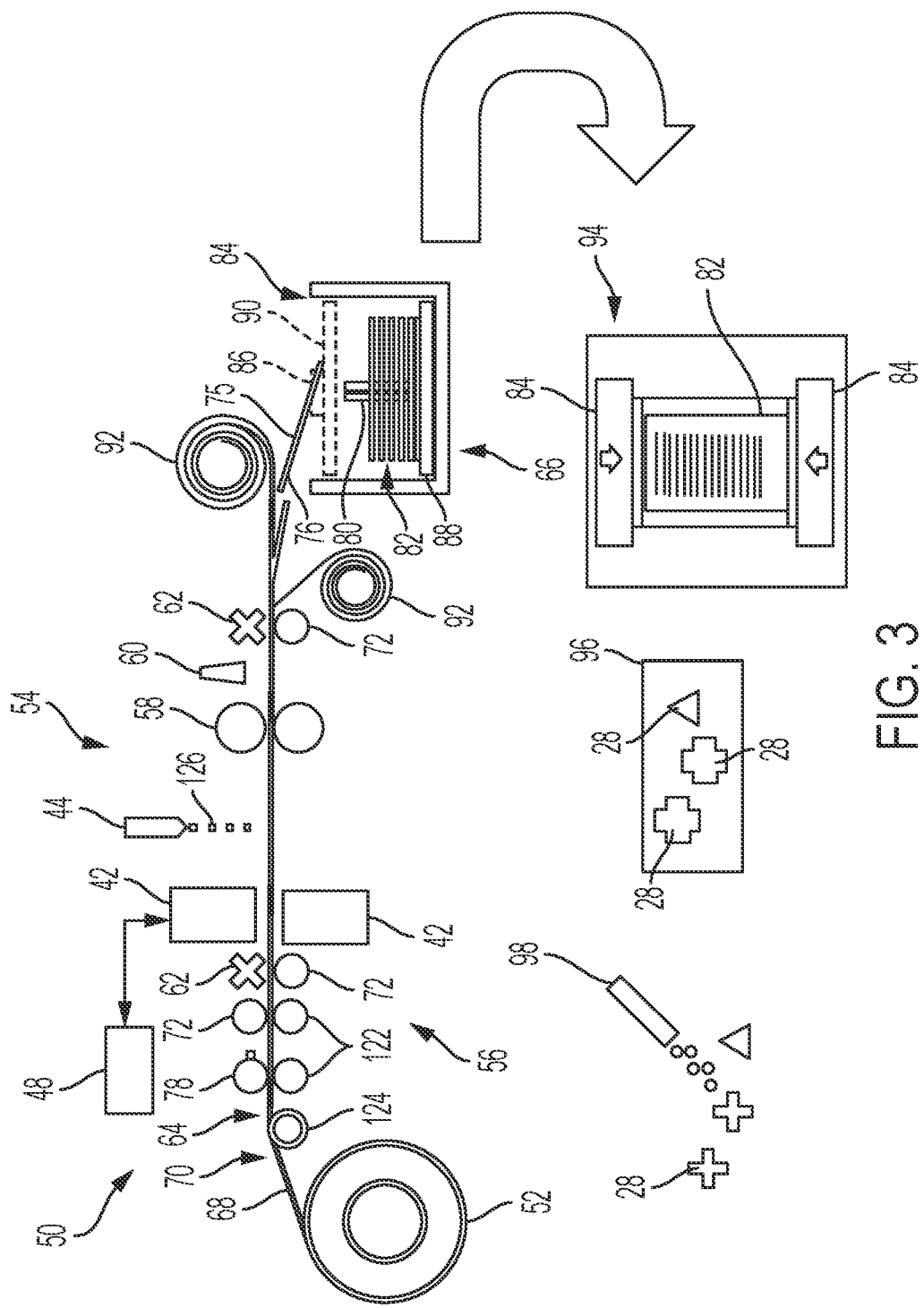
FIG. 3 is a side view of an exemplary dense feedstock sintering based laminated object manufacturing 3D printing system that may fabricate one or more 3DP/AM parts via stacked XY-Z printing in accordance with an example of the embodiments.

FIG. 3 depicts an exemplary sintering based laminated object manufacturing (LOM) 3D printing system 50 that may fabricate one or more 3DP/AM parts via stacked XY-Z printing by using a sequential, pattern-wise deposition of anti-sintering agents (e.g., de-binding agents). In particular, the 3D printing system 50 carries out feedstock handling, layer patterning and layer attachment of selective sintering of dense, cohesive feedstocks, and may include components such as a material feeder roll 52, an active material deposition subsystem 42, a viscosity modifier 36, an image-forming device 54 (e.g., selective inhibition sintering mechanism such as the anti-sintering/de-binding agent jetting subsystem 22 and the anti-sintering agent deposition subsystem 44), a sheet cutter 62, a transfer subsystem 64, a stacker subsystem 66, and other features that connect and control the various components. While exemplary components are shown in FIG. 3, various alternative and optional components are also suitable for use with the system 50.

In illustrative implementations, a three-dimensional (3D) object is printed in accordance with a computer 3D model of the object, created by a computer-aided design (CAD) program. For example, the CAD program may be a free-form non-uniform rational basis spline (NURBS) program, or the CAD program may be Solid Works®. For each slice of the 3D object, dense feedstock powder is attached and inked in a pattern that correspond to positions in the slice where the 3D object exists. Thin slices of the 3D CAD model may be created, for example, by starting with a 3D model in STL file format and using the Slice Commander feature of Netfabb (R) Studio software (available from Netfabb GmbH, Parsberg, Germany) to create the thin slices. This cycle of selectively patterning substrate sheets repeated for as many additional substrate sheets as required for making the specified 3D part or object, with each sheet normally representing a layer of the 3D part or object. In the 3D printing system 50, active material 12 of dense feedstock may be freestanding as substrate 68 or may be deposited on a thin substrate 68 that is removed from the feedstock before stacking. The feedstock is a cohesive, dense, or partially dense material consisting of a sacrificial binder (e.g., polymers used in feedstocks for metal injection molding, ceramic tape casting) and particles to be sintered (i.e., metals, ceramics, or plastics). Sheets can be thin or thick, for example from about 1 micron −1 cm, or less than about 500 microns.

The sheet-like feedstock of active material 12 may be in roll or precut form from the material feeder roll 52 (FIGS. 3, 5, 6), in precut form from a sheet dispenser 65 (FIG. 4) or may be deposited onto the substrate 68, which may be a backing substrate, by the active material deposition subsystem 42. While the active material deposition subsystem 42 may be seen under the substrate 68, it is understood that the subsystems are not limited to an orientation to the substrate and in examples may be located on either side of the substrate. The active material deposition system 42 may deposit (e.g., spray, shoot, deposit, extrude or otherwise mechanically apply) the active material 12 to be 3D printed onto the substrate 68. In examples where the active material deposition subsystem 42 is above the substrate 68, and the active material is a solid powder, the active material deposition subsystem may include a trough containing the powder. The trough may have a slitted opening adjacent the substrate and be connected to an electromechanical vibrator of the deposition subsystem. The vibrator, when active, causes the powder to flow through the slitted opening and out of the trough onto the substrate while it moves under or adjacent the trough. The vibrator may be actuated by a controller 48. In examples, the step of depositing feedstock may include a sub step of directing active material 12 toward the substrate 68 in a non-selective manner. For example, this sub step may include flooding the entire surface of the substrate with the active material. Or for example, in xerographic or magnetographic examples, this sub step may include sending electrically charged or magnetized feedstock toward the entire substrate layer.

The substrate material 68 with the layer of dense feedstock active material 12 may be transferred to the anti-sintering agent deposition subsystem 44 via the transfer subsystem 64, which may include a tensioning mechanism 70 together with feed rollers 72 used to hold and advance the web defined by the length of the substrate material fed through the 3D printing system 50. The tensioning mechanism 70 may include one or more rollers 74 situated to keep the substrate material 68 and/or sheet-like feedstock of active material 12 flat as it is fed through components of the 3D printing system. The substrate material 68 in web form can be cut into sheets before, during or after the 3D printing, for example in FIG. 3 a cutter 62 may cut the web into single sheets before 3D printing and/or after 3D slice formation, and prior to stacking, as discussed in greater detail below.

Figure 4:
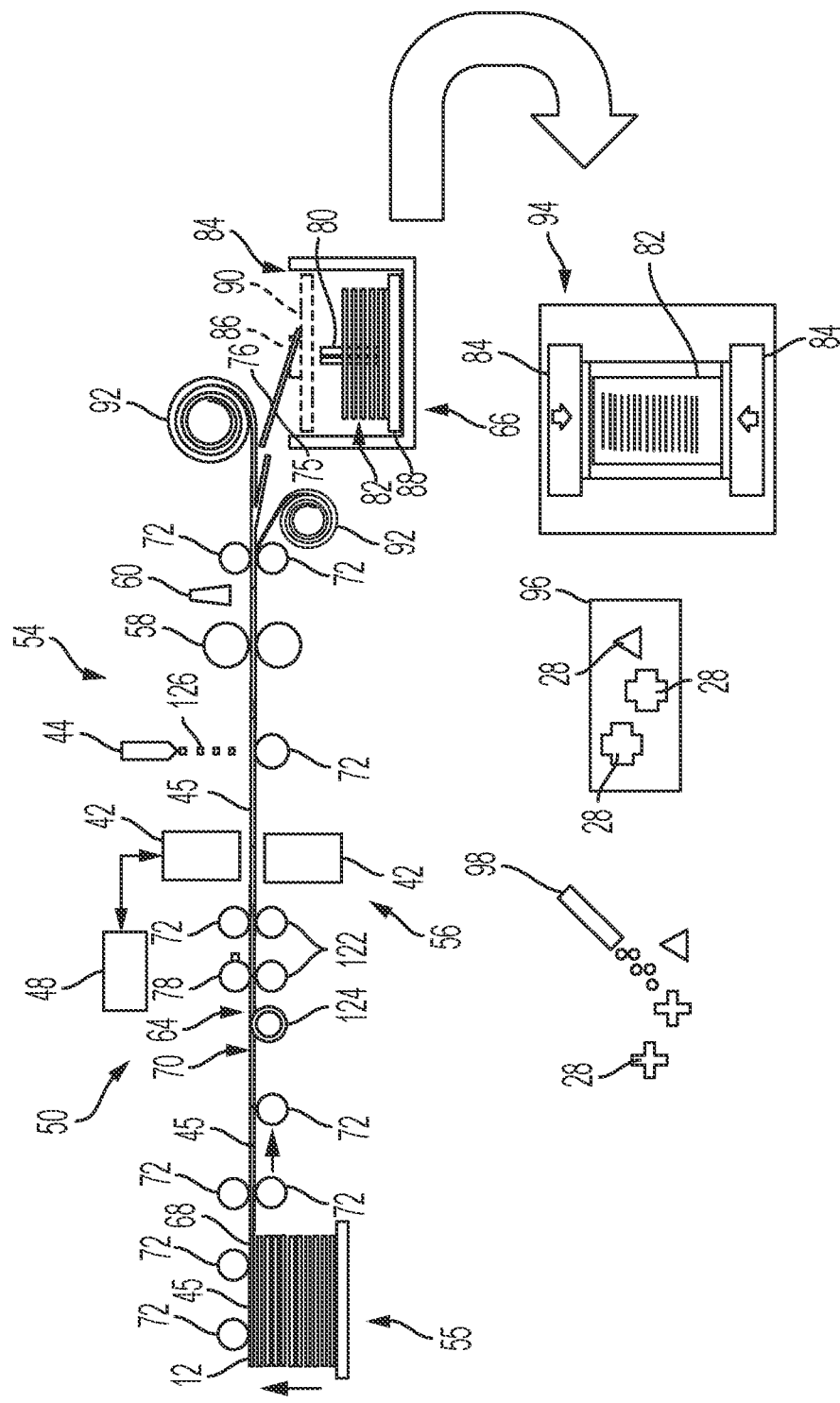
FIG. 4 is a side view of an exemplary dense feedstock sintering based laminated object manufacturing 3D printing system with web sheets in precut form from a sheet dispenser in accordance with an example of the embodiments.
Figure 5:
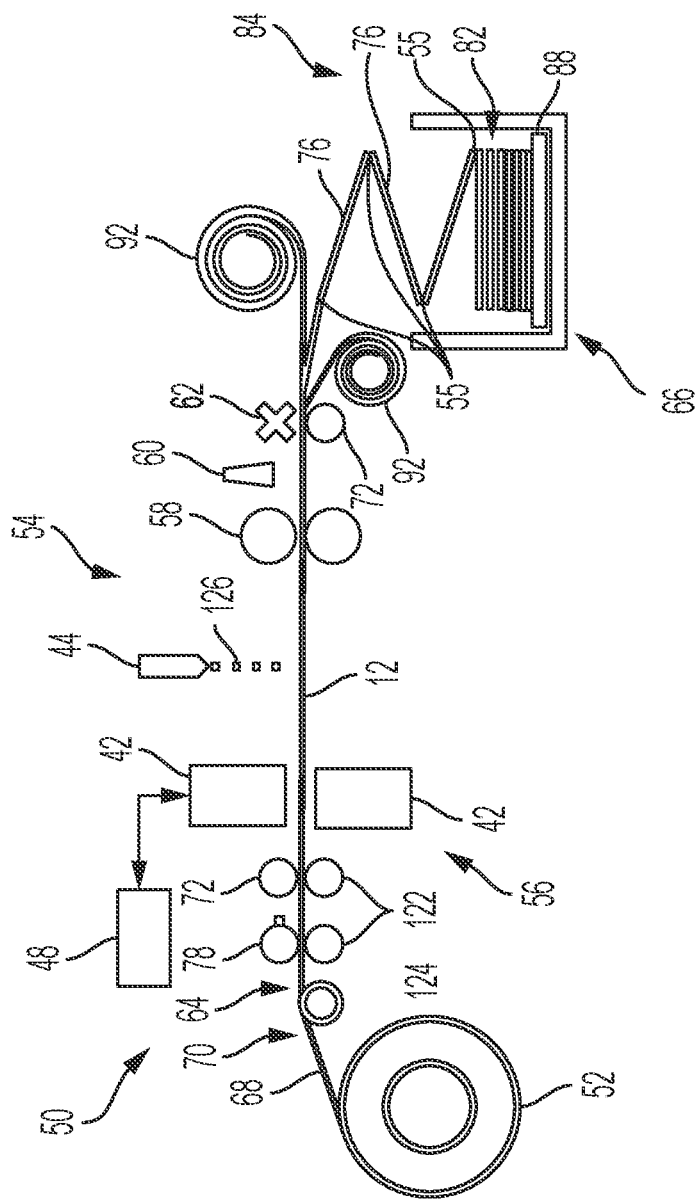
FIG. 5 is a side view of a stacker subsystem with printed dense feedstock slices folded to form a build monolith stack in accordance with an example of the embodiments.

In examples, adjacent 3D slices on the transfer subsystem 64 may have slice boundary sections that define respective slices. The slice boundary sections may include weakened sections (e.g., fold lines 55, perforated lines, boundary lines) thinned, partially cut or fully cut between respective slices such that the stacking of 3D slices may include placing segregated printed slices on top of one another or folding the printed slices along the weakened sections as fold lines (e.g., accordion folding) back-and-forth to form a stack 82 (FIG. 5). In examples, the substrate material 68 with the layer of dense feedstock active material 12 form a 3D layer or 3D slices that have a weakened area or section between respective slices. The weakened sections may be preformed prior to engagement with the 3D printing system 50, partially cut or thinned (e.g., by cutter 62, laser) as desired for folding, or some other partial transverse cut across the dense feedstock active material 12 (e.g., fold lines 55 (FIG. 5)) or a full cut that segregates respective slices into separate 3D slices 75 (FIGS. 3, 4). In examples the slice boundary sections may not require a cut or thinning along weakened sections for folding of adjacent printing slices, and may designate slice folds between the adjacent slices.

The feedstock is fed to a print area, where the anti-sintering agent deposition subsystem 44 patterns the feedstock layer with an anti-sintering/de-binding agent 26 carried in an ink, which may be either a positive or a negative patterning agent. A variety of patterning methods may be used by the anti-sintering agent deposition subsystem 44 to apply the anti-sintering/de-binding agent 26, including inkjet printing, shadow masking, offset printing, and screen printing. The anti-sintering/de-binding agent 26 may be deposited via a variety of approaches. For example, the anti-sintering agent deposition subsystem 44 may include a thermal inkjet head or a piezoelectric inkjet head to dispense the fluid. In examples, the anti-sintering agent deposition subsystem 44 may apply air pressure to dispense the agent 26. The anti-sintering agent deposition subsystem 44 may also include a solenoid valve if air pressure is used to control the release of air or dispensing of fluid. Processes to fix or develop the anti-sintering/de-binding agent 26 may also be performed, such as drying a solvent out of the ink through heat or forced convection (e.g., fuser 58), and introducing a liquid or gas reactant (e.g., via nozzle 60) to cause a precipitation reaction from the ink. Patterning may be achieved through selective deposition of the ink, or by selectively changing the surface energy of the layer before applying the ink as readily understood by a skilled artisan.

As noted above in the exemplary 3D printing system 50, the roll 52 of substrate material 68 is mounted and situated ahead of the active material deposition subsystem 42. While not being limited to a particular theory, the web of substrate material 68 can extend through all of the components of the 3D printing system 50, including the active material deposition subsystem 42 and the anti-sintering agent deposition subsystem 44, and then be cut by the cutter 62 into single sheets 76 prior to stacking, with the sheets corresponding to a layer or slice of a 3D object. In examples, the web of substrate material 68 may be cut by the cutter 62 into single sheets 76 at any prior point in the process. For example, the web may be converted to a single sheet prior to advancing the resulting substrate sheet to the active material deposition subsystem 42. Likewise, the web and deposited active material feedstock may be converted to a single sheet after the active material deposition subsystem 42 and before the anti-sintering agent deposition subsystem 44. Further, if no substrate is used, the sheet of feedstock may be cut into individual slices of the active material 12. In examples, the web may be precut into individual sheets, with the sheets arranged as a stack of sheets held by the material feeder for individual processing by the AM system. The cutter 62 may cut the sheet with a mechanical instrument (e.g., blade, punch) or other approach (e.g., laser) as well understood by a skilled artisan.

In examples, the 3D printing system 50 may also include a punching device 78 for placing registration apertures in the substrate material 68, deposited dense feedstock and/or substrate sheets 76 thereof at desired locations. The registration apertures may be placed in precise, pre-defined positions relative to the position of the substrate sheet and/or deposited feedstock for precise alignment of the patterned marking material images printed onto the feedstock sheets. This can be accomplished by mounting the punching device 78 proximate to the dense feedstock layer/substrate material 68 being moved by the transfer subsystem 64, for example, on the same frame that the active material deposition subsystem 42 and the anti-sintering agent deposition subsystem 44 are placed, or using other alignment mechanisms that are well known in the art. The punching device 78 may include a hard instrument that pokes registration apertures out of the substrate material 68/active material 12, or a laser cutter that cuts registration apertures from the substrate material/active material.

The dense feedstock sheets (layers, slices) may be stacked and attached (e.g., lamination) to form a 3D build monolith, for example by aligning the dense printed feedstock slices or feedstock printed substrate sheets via aligning their registration apertures or their anti-sintering/de-binding agent printings. A stacker subsystem 66 is configured for stacking and attaching the cut printed dense feedstock slices/printed substrate sheets 76 in register, based on the aforementioned registration alignment. As can be seen in FIG. 3, the stacker subsystem 66 receives the dense printed feedstock slices/printed substrate sheets 76 with registration apertures aligned about registration pins 80 of the stacker subassembly to form a stack 82 of the printed sheets. For the first layer, the lamination may be skipped, or the lamination may fix the first dense feedstock slice to a support substrate. As an example of the attachment, if the binder in the dense feedstock is a thermoplastic, the printed dense feedstock layers may be attached by heating the top layer (e.g., via top plate heater 90 or another heater adjacent the top layer) of a stacked dense printed feedstock slice/printed substrate sheet 76 before another layer is added to the stack 82. The layers could also be attached by applying UV radiation, pressure, or another energy source or combination of energy sources (e.g., if the binder is a UV-reactive polymer). For example, FIG. 1 shows the stacker subsystem 66 including a compressive device 84 having one or more elastic components (e.g., springs 86) to maintain pressure on the printed dense feedstock slices/printed substrate sheets 76. After a number (e.g., 1, 2, less than 10, less than 100, etc.) of dense feedstock slices (layers) have been placed onto the stacker subsystem 66, one printed dense feedstock layer 76 on top of another on a bed plate 88, the stacked layers may be compressed together with the spring 86 exerting presser on top plate 90, which may be heated, towards the bottom bed plate.

The dense feedstock printed layers may also be attached through use of an adhesive, either pre-applied to the feedstock sheets, or applied between layers. If no additional adhesive is used, then low anisotropy parts can be produced, a unique benefit of this approach. The lamination between sheets is repeated until all cross-sectional layers of the part have been added to the build monolith object. At this stage the build monolith object is known as a green part having uniform dense feedstock density throughout the part, and can be removed from the apparatus used for attaching and patterning the layers. In examples where the active material 12 is deposited onto a substrate 68 and printed with ink having the anti-sintering/de-bonding agent, the substrate may be removed from the printed dense feedstock layer and rewound as a web of substrate material 92, as understood by a skilled artisan. For example, depending on relative orientation of the substrate 68 and active material 12, the substrate may be removed from the printed dense feedstock layer 76 by separating and rewinding the web of substrate material 92 below or above the dense feedstock layer before stacking the layers at the stacker subsystem 66.

As noted above, the sheet-like feedstock of active material 12 may be in roll or precut form from the material feeder roll 52, in precut form from a sheet dispenser 65 or may be deposited onto the substrate 68, which may be a backing substrate, by the active material deposition subsystem 42. FIG. 4 depicts an example of the feedstock of active material 12 in precut sheets 45 from a sheet dispenser 65. The sheets 45 may include a layer of active material 12 free standing or on a substrate material 68. In examples, the sheets 45 may initially include the substrate material 68, with the layer of active material feedstock added via the active material deposition subsystem 42. In examples where the sheets 45 that start along the transfer subsystem 64 from the sheet dispenser 65 already have a layer of dense feedstock active material, as understood by a skilled artisan, the active material deposition subsystem 42 may be redundant and not needed for further feedstock deposition.

Figure 6:
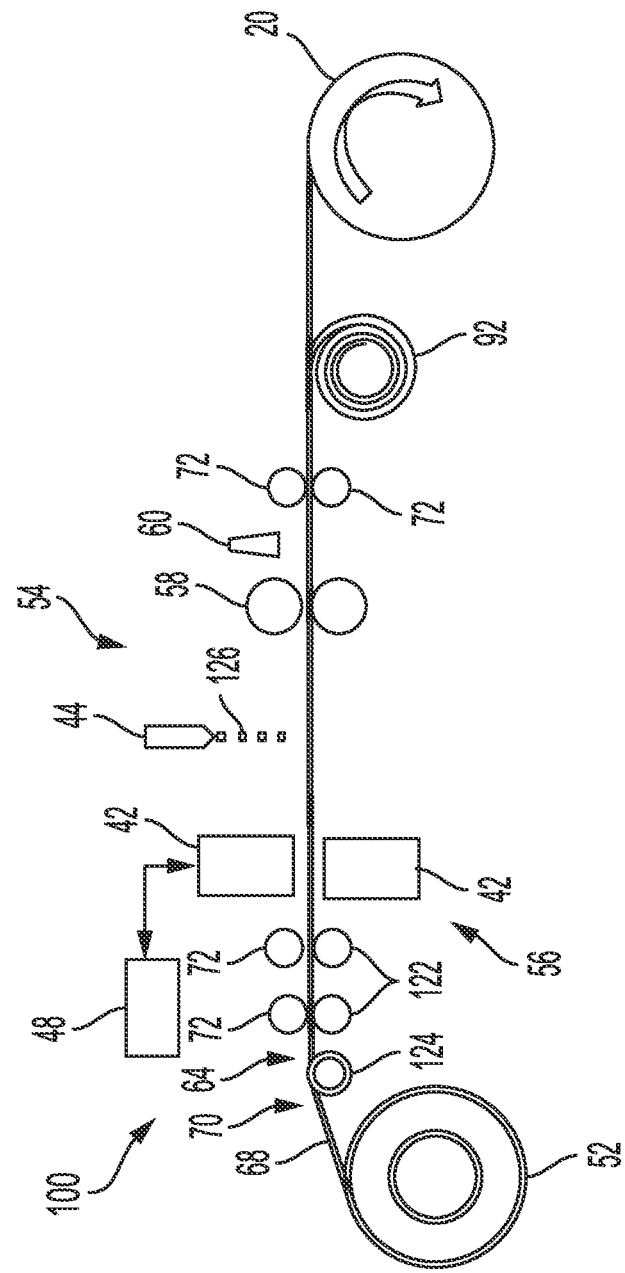
FIG. 6 is a side view of an exemplary dense feedstock sintering based laminated object manufacturing 3D printing system that may fabricate one or more 3DP/AM parts via outwardly growing rotating cylinder additive manufacturing in accordance with an example of the embodiments.

The approach of stacking free-standing or backed, preformed sheets of dense feedstock may be implemented in an XYZ (FIGS. 3-5) or a cylindrical geometry (FIG. 6). In XYZ 3D formation, the printed dense feedstock layer sheets 76 may be pre-cut and stacked, or folded into a stack 82, with the appropriate ink deposition and laminating between layers. In a cylindrical geometry, the feedstock would be built up by winding onto a central axis as discussed above and further demonstrated by example in FIG. 6.

FIG. 6 depicts an exemplary sintering based laminated object manufacturing (LOM) 3D printing system 100 that may fabricate one or more 3DP/AM parts via outwardly growing rotating cylinder printing by using a sequential, pattern-wise deposition of anti-sintering agents (e.g., de-binding agents). In particular, the 3D printing system 100 is similar to the 3D printing system 50 and also carries out feedstock handling, layer/slice fabricating and layer/slice patterning of selective sintering of dense, cohesive feedstocks, and may include components such as a material feeder roll 52, an active material deposition subsystem 42, a viscosity modifier 36, an image-forming device 54 (e.g., selective inhibition sintering mechanism such as the anti-sintering/de-binding agent jetting subsystem 22 and the anti-sintering agent deposition subsystem 44), and other features that connect and control the various components. As can be seen in FIG. 6, the web sheet and build process may occur in a cylindrical geometry, with or without an integral or removable axial support spindle or drum. While exemplary components are shown in FIGS. 1-6, various alternative and optional components are also suitable for use with the system 100.

As discussed above, the sheet-like feedstock of active material 12 may be in roll or precut form from the material feeder roll 52 or may be deposited onto the substrate 68, which may be a backing substrate, by the active material deposition subsystem 42. The active material deposition system 42 may deposit (e.g., spray, shoot, deposit, extrude or otherwise mechanically apply) the active material 12 to be 3D printed onto the substrate 68. Dense feedstock depositing may include a sub step of directing active material 12 toward the substrate 68 in a non-selective manner. For example, this sub step may include flooding the entire surface of the substrate with the active material. Or for example, in xerographic or magnetographic examples, this sub step may include sending electrically charged or magnetized feedstock toward the substrate layer.

Similar to discussion above referencing FIG. 3, in FIG. 6. the substrate material 68 may be transferred to the anti-sintering agent deposition subsystem 44 via the transfer subsystem 64, which may include a tensioning mechanism 70 together with feed rollers 72 used to hold and advance the web defined by the length of the substrate material fed through the 3D printing system 50. The tensioning mechanism 70 may include one or more rollers 74 situated to keep the substrate material 68 and/or web-like feedstock of active material 12 flat as it is fed through components of the 3D printing system.

The feedstock is fed to a print area, where the anti-sintering agent deposition subsystem 44 patterns the feedstock layer/slice with an anti-sintering/de-binding agent 26 carried in an ink, which may be either a positive or a negative patterning agent. A variety of patterning methods may be used by the anti-sintering agent deposition subsystem 44 to apply the anti-sintering/de-binding agent 26, including inkjet printing, shadow masking, offset printing, and screen printing. Processes to fix or develop the anti-sintering/de-binding agent 26 may also be performed, such as drying a solvent out of the ink through heat or forced convection (e.g., fuser 58), and introducing a liquid or gas reactant (e.g., via nozzle 60) to cause a precipitation reaction from the ink. Patterning may be achieved through selective deposition of the ink, or by selectively changing the surface energy of the layer before applying the ink as readily understood by a skilled artisan.

As can be seen in FIG. 6, the roll 52 of substrate material 68 may be mounted and situated ahead of the active material deposition subsystem 42, as well understood by a skilled artisan. While not being limited to a particular theory, the web of substrate material 68 may extend through all of the components of the 3D printing system 50, including the active material deposition subsystem 42 and the anti-sintering agent deposition subsystem 44. The dense feedstock printed layer/slice may then be wound continuously in a concentric, spiral manner to build the rotating cylinder 20 from a starting central core 24 and fabricate desired shapes (e.g., various 3D printed shapes/parts) embedded within the support material 46 of the cylinder. Substrate 68 that is not part of the patterned cylinder 20 monolith may be removed from the dense feedstock printed layer/slice and rewound as a web of substrate material 92, as understood by a skilled artisan.

As discussed above, the dense feedstock printed layers/slices may also be attached through use of an adhesive, either pre-applied to the feedstock sheets, or applied between layers. If no additional adhesive is used, then low anisotropy parts may be produced, a unique benefit of this approach. The term "low anisotropy" may refer to small differences in relevant material properties (e.g., below 50%, below about 20%, below about 10%, below about 5%, below about 1%) in the process direction (e.g., along the transfer subsystem 64) vs. orthogonal directions. Relevant materials properties may include tensile or compressive strength or modulus, thermal conductivity, electrical conductivity, density, coefficient of thermal expansion, etc. as understood by a skilled artisan. The orthogonal directions on which to assess the low anisotropy property may be applied via multiple geometries, for example, XYZ, or cylindrical (i.e., axial-radial-circumferential). The lamination between sheets may be repeated until all cross-sectional layers of the part have been added to the build monolith object. At this stage the build monolith object is known as a green part having uniform dense feedstock density throughout the part, and can be removed from the apparatus used for attaching and patterning the layers/sheets.

Referring to FIGS. 2-6, the laminated build monolith may then undergo binder removal and subsequently sintering. Methods for binder removal may include solvent or supercritical CO2 extraction, or thermal decomposition of the binder via thermal de-bind at a temperature below the sintering temperature. In a thermal de-bind, the build monolith may be heated, for example in debind container 94 (e.g., oven, chemical isolating housing) to remove dense feedstock binder as liquid or gas, through combustion, vaporization, or decomposition. Thermal de-bind may be compatible with a wide range of binders: thermosets, hydrophilic thermoplastics, and hydrophobic thermoplastics. Heating between about 100° C. and 500° C. in air, in inert atmosphere such as $N_2$ or Ar, or in vacuum or a reducing (e.g., $H_2$-containing) atmosphere is typical for such a thermal debind, with the temperature selected as a lowest temperature to remove the binder without causing unwanted chemical changes in the dense feedstock (e.g., oxidation if the feedstock is a metal).

In a solvent de-bind, the build monolith may be immersed in a debind container 94 (e.g., solvent, or supercritical $CO_2$ housing) to dissolve away the binder. Commonly, a solvent de-bind could result in de-patterning of the selective-sintering agent, as the agent can dissolve and leach out in the de-binding solvent. However, the inventors overcome this challenge by incorporating an activation step, where the selective-sintering agent 26 may be transformed into an insoluble mass prior to de-binding. Solvent de-bind may be particularly suited to ink-feedstock systems where the selective-sintering agent has opposite solubility behavior to the feedstock binder, for example an ionic salt selective-sintering agent with a hydrophobic feedstock binder. In such systems, the solvents suitable for de-binding will have lower tendency to leach out the selective-sintering agent. In either solvent de-binding or thermal de-binding, some or all of the binder is removed. Solvent de-bind and thermal de-bind may also be combined to remove the binder content in stages. In examples, residual binder may be desirable to maintain high green strength in the part (e.g., less than about 3 wt % binder).

As can be seen in FIGS. 2 and 3, sintering may be performed in a controlled atmosphere 96 such as under vacuum, or in a reducing or oxidizing gas environment (e.g., hydrogen, forming gas, Ar, $N_2$, air). For metal feedstocks, sintering is often performed in a reducing environment such as forming gas (e.g., about 2-4% $H_2$ in Ar), or pure $H_2$. As discussed above, during any time between ink deposition by the anti-sintering agent deposition subsystem 44 and early stages of sintering, the anti-sintering/de-binding agent 26 can undergo an optional activation process. For example, if the ink is a salt that is soluble when printed, it can be precipitated out by evaporating the solvent from the ink, and then thermally decomposed via a heater 38 (e.g., via a heater, heating element, laser, diode, oven) into a ceramic particle as understood by a skilled artisan. In examples the dense feedstock may be a metal powder in a polymer binder, and the ink patterning agent may be an anti-sintering agent such as an aluminum salt dissolved in a solvent. The salt forms a refractory ceramic oxide below the sintering temperature of the metal, where the oxide has a higher sintering temperature than the metal.

Finishing after sintering involves separating sintered and unsintered regions, producing surface-finish, and machining areas that require high tolerance. Separating may require a significant amount of force, such as hammering, cracking, freeze-fracturing, etching, abrasive blasting (e.g., sand blasting from a 3D object finisher 98), or chiseling to arrive at the finished 3D printed object as well understood by a skilled artisan. The finishing described herein typically results in a near net-shape part, and precision dimensions are achieved through finishing steps.

The process carried out by the 3D printing system 50 may be sequenced and monitored using one or more controllers 48. The controller 48 may read and execute build instructions generated by an outboard computer (not depicted) based on a 3D model of the object that is to be printed. For example, the material feeder roll 52, image forming device 54 (e.g., selective inhibition sintering mechanism, anti-sintering/de-binding agent jetting subsystem 22, anti-sintering agent deposition subsystem 44), powder subsystem 56 (e.g., active material deposition subsystem 42), fuser 58, nozzle 60, cutter 62, transfer subsystem 64, punching device 78 and stacker subsystem 66 may operate as discussed herein based on input from the controllers. Thus while the controller 48 is shown in communication with the image forming device 54, it is understood that the controller may be in communication with any component of the 3D printing system.

In the examples, the choice of ink components depends on the active material to be sintered, and whether the ink is to be negative-patterned or positive-patterned. For negative patterning of metal feedstocks, the active sintering selectivity material includes a material that sinters at a higher temperature than the metal, often a refractory ceramic, a precursor to a refractory ceramic, or an oxidizing agent that selectively transforms the metal into a refractory ceramic. The inhibiting material either forms a conformal layer on the sinterable particles in the pattern, or separate particles. Examples of materials that sinter at temperatures above most engineering metals, such as bronze, brass, aluminum alloys, and steel, include aluminosilicate minerals, alumina, zirconia, iron oxide, chromite, ceria, yttria, silicon carbide, calcium oxide-containing ceramics, magnesium oxide-containing ceramics, or mixtures/solid solutions thereof. Active materials may be nanoparticles or microparticles of these materials suspended in ink, or chemical precursors to the ceramics such as salts that decompose and form a metal oxide when exposed to process steps such as thermal debind, early sintering, or reaction with a solution in a solvent-debind step. Suitable salts include aluminum nitrate, aluminum bromide, aluminum chloride, aluminum hydroxide, aluminum iodide, aluminum phosphate, aluminum lactate, aluminum sulfate, aluminum monostearate, zirconium nitrate, zirconium carbonate, ammonium zirconate, zirconyl chloride, zirconyl nitrate, yttrium carbonate, yttrium chloride, yttrium nitrate, iron acetyl acetonate, ferrocene, iron citrate, iron chloride, iron bromide, iron oxalate, iron phosphate, iron sulfate, iron nitrate, cerium bromide, cerium chloride, cerium hydroxide, cerium nitrate, cerium oxalate, cerium sulfate, ceric ammonium nitrate, and others. The non-metal ion in the metal-salt may be selected to be an oxidizing agent such as sulfate, ammonium nitrate, chlorate, chlorite, hypochlorite, perchlorate, permanganate, persulfate, or nitrate, to enhance the sintering inhibition. Some metal ions also enhance oxidizing behavior, such as cerium ions. These oxidizing ions may also be part of a compound that does not contain a metal ion, such that the ink acts solely to oxidize the sintering metals in the inhibition pattern.

In positive patterned metals, the active component of the material is a reducing agent or flux to facilitate sintering. The reducing agent may be particles of graphite, graphene, carbon nanotubes, fullerenes, other forms of carbon with $sp_2$ bonding, sodium borohydride, reducing sugars, glucose, compounds containing tin(II), compounds containing iron (II), oxalic acid, formic acid, ascorbic acid, acetol, alpha-hydroxy ketones, phosphorous acid, phosphites, hypophosphites, borax, ammonium chloride, and hydrochloric acid.

The active sintering selectivity material for negative patterned ceramics may use a similar strategy for the active selective sintering agent as negatively patterned metals, by introducing a material with a higher sintering temperature than the ceramic to be sintered, either directly through particles, or indirectly through chemical precursors. The oxidative strategy for sintering inhibition is not generally used. The active sintering selectivity material for positive patterned ceramics varies widely based on the type of ceramic. Addition of ceramic fluxes or precursors to ceramic fluxes is one strategy. Ceramic fluxes are typically oxides of or compounds containing lead, sodium, potassium, lithium, calcium, magnesium, barium, zinc, strontium, and manganese, feldspars, boron, and glass frit particles with low glass transition.

For polymeric feedstocks, the polymer to be sintered may be embedded in a binder that has a lower processing temperature (glass transition or melting point). Sintering selectivity material may include a lubricant, surfactant, that prevents bonding (negative selectivity), or a plasticizer/solvent selective for the feedstock polymer, chemical linker or selective adhesive to promote adhesion between particles. Polymer sintering may be applicable to thermoplastic materials. Examples of polymers suitable for sintering include fluorinated ethylene propylene, polytetrafluoroethylene, polyetheretherketone, polyamides, polyacrylonitrile butadiene styrene, polylactic acid, or other polymers used in SLS or FDM processes.

Other components of the ink depend on the deposition process. Other components may include solvents to suspend or dissolve other components, viscosity modifiers, surfactants, and stabilizers. Examples of solvents include water, organic solvents, volatile solvents, or high boiling point solvents, polar, or non-polar solvents, toluene, xylenes, alkanes, decane, hexane, isopar, n-methylpyrrolidone, dimethylformamide, tetrahydrofuran, dimethylsulfoxide, and acetophenone. Viscosity modifiers and surfactants may be the same as chemicals used in the feedstock as binders, surfactants, and viscosity modifiers components of the feedstock. Some of these include glycerin, polymers or oligomers that are soluble in the solvent, small quantities of materials used as binders in the feedstocks, stearic acid, sodium dodecyl sulfate, and others (see discussion on feedstock components). For example, to pattern ink using an image-forming device 54 having a piezo-driven inkjet printhead, ink viscosity in the range of 10-14 cP is desired. If the ink contains components that may undergo slow degradation, stabilizers may be used to extend shelf life. Some stabilizers include antioxidants, UV absorbers, butylated hydroxytoluene, and 4-methoxyphenol.

Simple solvents do not simultaneously dissolve feedstock and sintering inhibitor (Al2(NO3)3). Polar solvents such as NMP and DMF (n-methylpyrrolidone and dimethylformamide) dissolve the inhibiting salts. Non-polar solvents dissolve the feedstock. For ink to penetrate a feedstock layer, the ink has to dissolve both. NMP and xylenes as co-solvents may dissolve both salt and feedstock, but they form a phase-separated 2-liquid system. Regarding ink formulations having 2 co-solvents, n-methylpyrrolidone, NMP, and xylenes, and a precursor to a sintering inhibitor, $Al_2(NO_3)2$, NMP is a polar solvent that dissolves $Al_2(NO_3)3$, and xylenes is a nonpolar solvent that helps wetting between the salt-carrying ink and the hydrophobic feedstock. There is a formulation in this space where the ink may dissolve both feedstock and salt, and forms a single liquid phase, for example with NMP above about 65 wt %, xylenes below about wt % and Al Nitrate below about 40 wt %.

Figure 7:
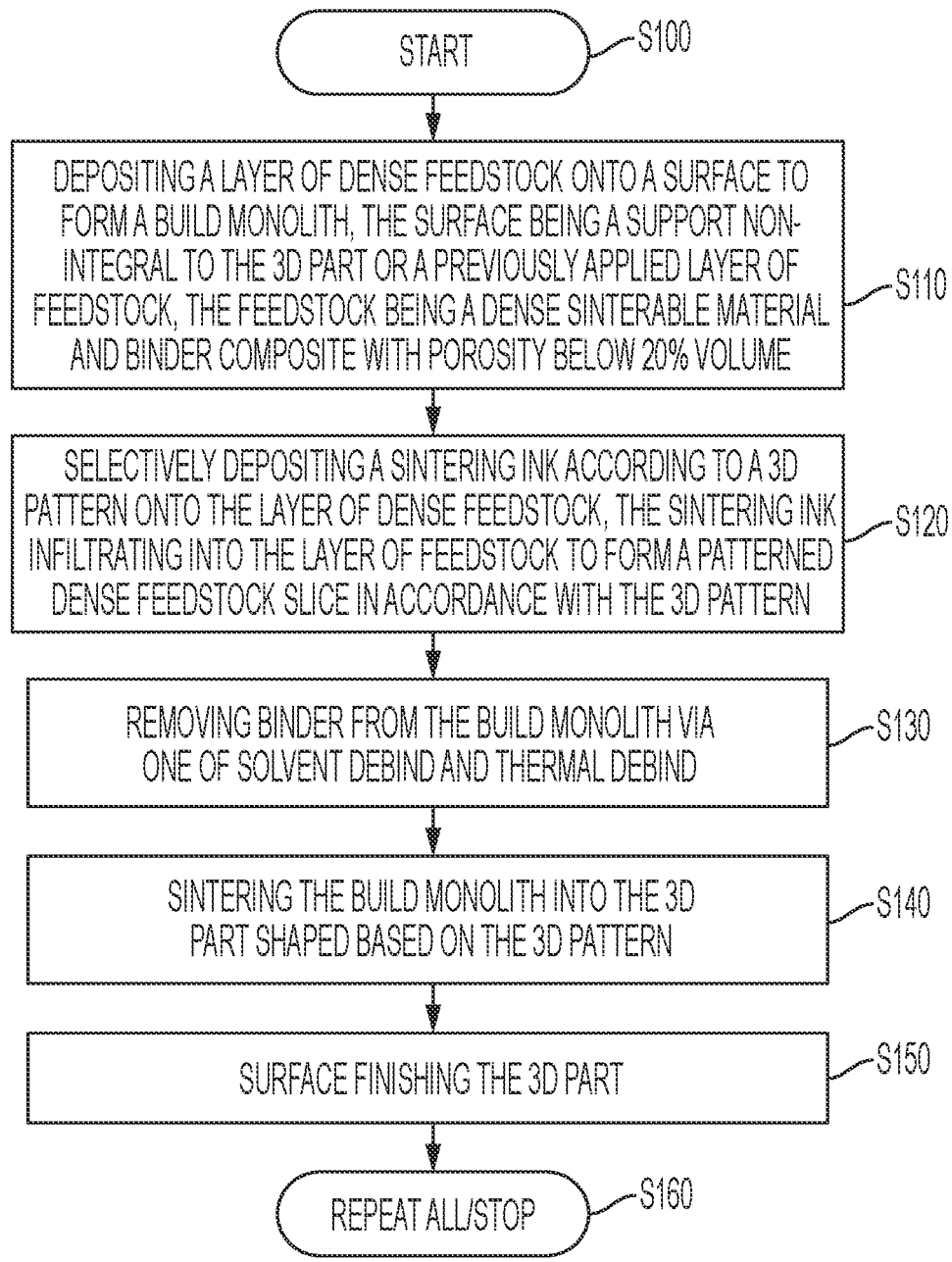
FIG. 7 is a flowchart depicting the operation of an exemplary method for fabricating halftone colored additive manufactured composite structures in accordance with an example of the embodiments.

FIG. 7 illustrates a flowchart of exemplary methods for selectively patterning a dense sinterable additive manufactured feedstock structure into a 3D part via selective promotion of sintering with a 3D printing system. As shown in FIG. 7, operation of the method commences at Step S100 and proceeds to Step S110.

At Step S110, an active material deposition subsystem deposits a layer of feedstock onto a surface to form a build monolith. The surface may be a support non-integral to the 3D part, such as a central core of a build monolith cylinder, or to a previously applied layer of feedstock. The feedstock is a cohesive, dense material consisting of a sacrificial binder (e.g., polymers used in feedstocks for metal injection molding, ceramic tape casting, etc.) and particles to be sintered (e.g., metals, ceramics, or plastics), with the feedstock in a sheet-like form, either as a roll of material or as individual pieces. The feedstock can be free-standing or supported on a backing substrate that is removed before applying the next sheet. Sheets may be thin or thick, 1 micron –1 cm; preferred ranges may be less than about 500 microns.

In examples, the feedstock is a dense sinterable material and binder composite with porosity below about 20% volume, below 10% volume, or below 5% volume. The feedstock may be a liquid, a suspension, a slurry/paste, a solution, an emulsion, or a solid. Feedstock contains material(s) to be sintered (metal, ceramic, carbonaceous materials, and/or polymers), and binder (which can include polymers, solvent, surfactants, plasticizers, and/or adhesives). The sinterable material may exist as a powder, a soluble or emulsified component in the binder rather than powder, as fibers, platelets, or as other types of particles. The sinterable material may include particles of a range of shapes and sizes, or a range of material types/chemical compositions. The incorporation of dense feedstocks (e.g., metal injection molding feedstocks or feedstocks for tape-casting, slip-casting, or extrusion-based processes) into a selective-sintering process is new. The feedstock in the above form may be fed to the additive manufacturing process in pre-formed layers or sheets, either free-standing or on a backing substrate. This aspect of the feedstock is also new.

The dense feedstock deposition may include spreading a thin layer of the dense feedstock onto a surface which can be flat, curved, static, or in motion, heated, cooled, or at room temperature. The surface can be a surface of a revolving, outwardly growing cylinder 20. The feedstock could be melted, sheared, or pressed to facilitate deposition/adhesion onto the surface. The deposition could be accomplished by a variety of methods, including but not limited to spray coating, doctor blading, roller coating, slot-die coating, coextrusion, dip coating, spin coating, rolling, offset printing, gravure printing, flexographic printing, transfer rolling, or pre-forming the feedstock into supported or free-standing layers and transferring onto the surface. The surface for deposition could be a support that is not integral to the part, or it could be the previous build layer.

In some examples, the dense feedstock layer may be subject to a fixing process. The goal of the fixing process is to transform the feedstock from a state which is easy to apply as layer to a state where the feedstock forms a solid or semi-solid self-supporting structure. The fixing can facilitate thinner layers to be applied (e.g., <100 microns, <50 microns, <10 microns), which may result in higher resolution parts. Examples of a fixing process include drying solvent out of the feedstock to go from a low viscosity liquid to a dry, dense, solid powder-binder composite; UV-curing a feedstock containing a UV-curable liquid binder resin; applying the feedstock as a liquid at or above room temperature followed by cooling to form a solid at room temperature or below, as understood by a skilled artisan.

In some examples, the dense feedstock layer may be primed via a primer for ink deposition that may make the feedstock more compatible with the ink. An example of a priming step via a primer may include using a laser to ablate/evaporate/transform the binder in areas where ink is to penetrate, applying an oxygen plasma or ion bombardment to make the binder more hydrophilic, or applying a solvent-based ink formulation to dissolve the binder in areas where ink is to penetrate. In examples where the priming step may be patterned, the ink deposition step discussed in greater detail below may not be patterned. That is, ink would only wets areas where the priming occurred. In other examples, the priming step may be unpatterned, while the ink deposition step is patterned. Of course both the priming and ink deposition may be patterned. Operation of the method proceeds to Step S120.

At Step S120, an ink deposition subsystem, which may be an anti-sintering/de-binding agent jetting subsystem or anti-sintering agent deposition subsystem, selectively deposits a sintering ink according to a 3D pattern onto the layer of feedstock. In other words, the feedstock is fed to a print area, where the layer of feedstock is patterned with a sintering ink (e.g., a positive or a negative patterning agent). The sintering ink infiltrates into the layer of feedstock to form a patterned dense feedstock slice in accordance with the 3D pattern.

Ink deposition may be carried out though a pattern-wise process or by coating onto a selectively primed surface. Deposition may occur by spraying, screen printing, digital printing, inkjet printing, offset printing, or other patterned deposition methods understood by a skilled artisan. In certain examples including dense feedstock fixing, ink deposition may occur between feedstock deposition and feedstock fixing, after feedstock fixing, or during feedstock fixing. The ink may include a sintering inhibitor to be deposited on the negative space or boundary of the pattern, or it can carry a sintering promoter to be deposited in the positive space of the pattern. In examples, the feedstock binder may include a sintering inhibitor, and the ink may include an agent to deactivate the inhibitor as understood by a skilled artisan. In examples, the ink includes a sintering inhibitor or a chemical that is a precursor to a sintering inhibitor. The ink promotes selective sintering and includes solvent and active sintering-selectivity material. The ink may further include surfactant, co-solvent(s), and viscosity modifiers as needed to enable printing. Co-solvent and surfactant may increase the compatibility of ink with the feedstock binder.

After the ink is deposited during Step S120, the ink may be activated. The purpose of the activation step is to transform the active selective-sintering material in the ink from a state that is easily carried by the ink as a solution or emulsion, to a state that doesn't leach out or diffuse after deposition. The activation may include applying heat or gas flow to dry the ink and leave a solid residue of the active material, for example via the fuser 58 and/or nozzle 60 (FIGS. 3-6). The activation may include applying heat, UV, or an energy source to cause a chemical reaction or decomposition reaction to transform a precursor in the ink into a sintering inhibitor, or sintering-selectivity agent. The approaches of activation, immobilizing the active material, and chemically transforming a precursor may be performed in the same, or in separate activation steps. Activation may be performed during the build or between completion of the build and sintering, including during early stages of sintering. Operation of the method may repeat back to Step S110 to deposit another layer of dense feedstock onto a surface until the build monolith is completed.

In examples, the patterned feedstock can undergo post-shaping via molding, cutting, or conventional subtractive manufacturing techniques. Unlike other SLS process es where powder feedstocks are used, a build in the EHTAL architecture results in a monolith that can easily be shaped through manufacturing processes understood by a skilled artisan. For example, after patterning, the cylinder 20 may be turned on a lathe, stamped with a die, diced into disks, or other conventional post patterning shaping.

Operation of the method proceeds to Step S130, where binder is removed from the build monolith (e.g., via at least one of solvent debind and thermal debind). In a thermal debind, the build monolith is heated to remove feedstock binder as liquid or gas, through combustion, vaporization, or decomposition as understood by a skilled artisan. Thermal debinding is compatible with a wide range of binders including thermosets, hydrophilic thermoplastics, and hydrophobic thermoplastics. Heating between 100° C. and 500° C. in air, in inert atmosphere such as $N_2$ or AR, in vacuum, or in a reducing (e.g., $H_2$-containing) atmosphere may be provided for thermal debinding. The lowest temperature may be selected to remove the binder, without causing unwanted chemical changes in the feedstock (e.g., oxidation if the feedstock is a metal). In a solvent debind, the build monolith may be immersed in a solvent, or supercritical $CO_2$ to dissolve away the binder. Exemplary debinding approaches overcome typical challenges of de-patterning of the selective-sintering agent where the agent dissolves and leaches out in the debinding solvent by adding an activation step as discussed above to transform the selective-sintering agent into an insoluble species prior to debinding.

Solvent de-bind is particularly suited to ink-feedstock systems where the selective-sintering agent has opposite solubility behavior to the feedstock binder, for example an ionic salt selective-sintering agent with a hydrophobic feedstock binder. In such systems, the solvents suitable for debinding will have lower tendency to leach out the selective-sintering agent. In either solvent debinding or thermal debinding, some or all of the binder may be removed. Solvent debind and thermal debind may also be combined to remove the binder content in stages. Residual binder may be desirable to maintain high green strength in the part (e.g., <3 wt % binder). Operation of the method proceeds to Step S140.

At Step S140, the build monolith is sintered into the 3D part shaped based on the 3D pattern. Sintering may be performed based on requirements of the feedstock. For metal feedstocks, sintering may be performed in a reducing environment such as forming gas (2-4% $H_2$ in AR), or pure $H_2$. Sintering process parameters may be selected to provide optimal sintering of the feedstock and optimal inhibition for the selective-sintering agent. For metal feedstocks, selective sintering inhibitors are typically precursors to refractory ceramics that sinter at much higher temperatures than the metal precursors. For dense feedstocks, debinding and sintering process may be provided as understood by a skilled artisan.

Operation of the method shown in FIG. 3 proceeds to Step S150, where the 3D part is surface finished. Finishing after sintering involves separating sintered and unsintered regions, producing surface-finish, and machining areas that require high tolerance. Separating may require a significant amount of force, such as hammering, cracking, freeze-fracturing, sandblasting, or chiseling as well understood by a skilled artisan. The method for selectively patterning a dense sinterable additive manufactured feedstock structure into a 3D part via selective promotion of sintering with a 3D printing system described herein may result in a near net-shape part, and precision dimensions are achieved through the finishing step S150. Operation of the method may then continue back to Step S110 to make another 3D part, or cease at Step S460.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 4 and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Figure 8:
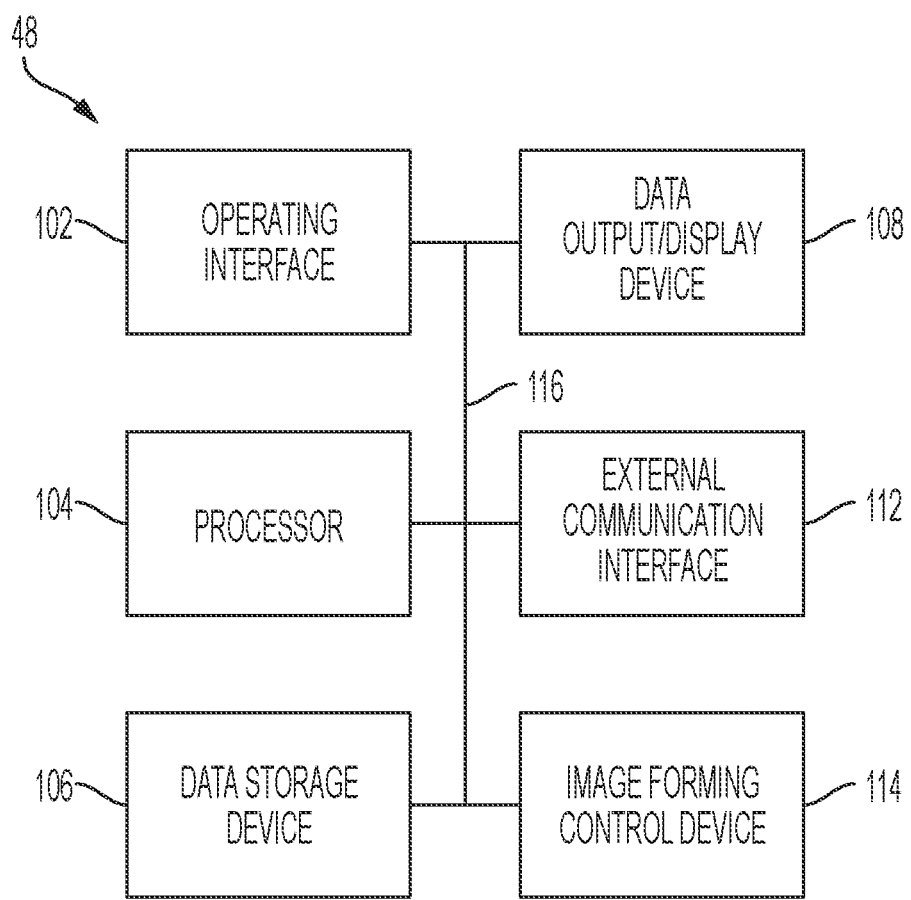
FIG. 8 is a block diagram of a controller with a processor for executing instructions to automatically control components and actions of the 3D printing systems device depicted in FIGS. 1-7.

FIG. 8 illustrates a block diagram of the controller 48 for executing instructions to automatically control exemplary devices in the AM systems depicted in FIGS. 1-4. The exemplary controller 48 may provide input, to or be a component of a controller for executing a 3D printing process in systems such as those described above and depicted in FIGS. 1-7.

The controller 48, also referred to herein as a control system, may include an operating interface 102 by which a user may communicate with the controller. The operating interface 102 may be a locally accessible user interface associated with the 3D printing systems 10, 40 and 50. The operating interface 102 may be configured as one or more conventional mechanism common to control devices and/or computing devices that may permit a user to input information to the controller 48. The operating interface 102 may include, for example, a conventional keyboard, a touchscreen with "soft" buttons or with various components for use with a compatible stylus, a microphone by which a user may provide oral commands to the controller 48 to be "translated" by a voice recognition program, or other like device by which a user may communicate specific operating instructions to the controller. The operating interface 102 may be a part or a function of a graphical user interface (GUI) mounted on, integral to, or associated with, the 3D printing system with which the controller 48 is associated.

The exemplary control system 48 may include one or more local processors 104 for individually operating the controller and for carrying into effect control and operating functions for AM 3D object forming, and specifically for implementing dense feedstock layer forming schemes. Processor(s) 104 may include at least one conventional processor or microprocessor that interpret and execute instructions to direct specific functioning of the controller 48, and control of the dense feedstock 3D object forming process with the controller.

The exemplary control system 48 may include one or more data storage devices 106. Such data storage device(s) 106 may be used to store data or operating programs to be used by the controller, and specifically the processor(s) 104. Data storage device(s) 106 may be used to store information regarding, for example, one or more 3D object models for producing dense feedstock 3D objects in an AM system with which the controller 48 is associated. Stored 3D object model information may be devolved into data for the printing of one or more layers of dense feedstock slices for forming the 3D object in the manner generally described above.

The data storage device(s) 106 may include a random-access memory (RANI) or another type of dynamic storage device that is capable of storing updatable database information, and for separately storing instructions for execution of system operations by, for example, processor(s) 104. Data storage device(s) 106 may also include a read-only memory (ROM), which may include a conventional ROM device or another type of static storage device that stores static information and instructions for processor(s) 104. Further, the data storage device(s) 106 may be integral to the controller 48, or may be provided external to, and in wired or wireless communication with, the controller, including as cloud-based data storage components.

The exemplary controller 48 may include at least one data output/display device 108, which may be configured as one or more conventional mechanism that output information to a user, including, but not limited to, a display screen on a GUI of the 3D printing systems 10, 40, 50 with which the controller may be associated. The data output/display device 108 may be used to indicate to a user a status of a dense feedstock sintered 3D object forming operation effected by the 3D printing systems with which the controller 48 may be associated including an operation of one or more individually controlled components at one or more of a plurality of separate processing stations or subsystems in the device.

The exemplary controller 48 may include one or more separate external communication interfaces 112 by which the controller may communicate with components that may be external to the controller. At least one of the external communication interfaces 112 may be configured as an input port to support connecting an external CAD/CAM device storing modeling information for execution of the control functions in the 3D object forming operations. Any suitable data connection to provide wired or wireless communication between the controller 48 and external and/or associated components is contemplated to be encompassed by the depicted external communication interface 112.

The exemplary controller 48 may include a dense feedstock image forming control device 114 that may be used to control the image forming process on the expanding cylinder 20 or substrate material 68 (e.g., image forming device 54, powder subsystem 56, fuser 58, active material deposition subsystem, anti-sintering/de-binding agent jetting subsystem 22, anti-sintering agent deposition subsystem 44) that produces the continuous dense feedstock slice for the cylinder 20 or dense feedstock slices (e.g., printed substrate sheets 76) for the in-process dense feedstock 3D object according to devolved 3D object modeling information. The substrate material 68 may be fed through the 3D printing system 50 to have the dense feedstock image layers formed thereon under the control of the dense feedstock image forming control device 114. The substrate material may exit the 3D printing system 50 as a printed substrate web and be cut and automatically stacked at an output side of the system to constitute a stack 82 of the printed sheets for forming a dense feedstock composite object. The dense feedstock image forming control device 114 may operate as a part or a function of the processor 104 coupled to one or more of the data storage devices 106, or may operate as a separate stand-alone component module or circuit in the controller 48. Either of the processor 104 or the dense feedstock image forming control device 114 may parse the input 3D object model information to determine and execute a dense feedstock material layer printing scheme in the 3D printing system 10, 40, 50.

The exemplary controller 48 may include a 3D composite object finisher control device (not shown) for executing a final 3D object shaping scheme on a build monolith in a subtractive machining process that may remove the support structure and surface finish the 3D object. As with the above-enumerated other separate control devices, the 3D dense feedstock object finisher control device may operate as a part or a function of the processor 104 coupled to one or more data storage devices 106 for executing finishing device operations, or may operate as a separate stand-alone component module or circuit in the controller 48.

All of the various components of the controller 48, as depicted in FIG. 8, may be connected internally, and to one or more AM dense feedstock composite object forming devices and/or components thereof, by one or more data/control busses 116. These data/control busses 116 may provide wired or wireless communication between the various components of the controller 48, whether all those components are housed integrally in, or are otherwise external and connected to a 3D printing system 10, 40, 50 with which the controller may be associated.

It should be appreciated that, although depicted in FIG. 8 as an integral unit, the various disclosed elements of the controller 48 may be arranged in any combination of subsystems as individual components or combinations of components, integral to a single unit, or external to, and in wired or wireless communication with the single unit of the controller. In other words, no specific configuration as an integral unit or as a support unit is to be implied by the depiction in FIG. 8. Further, although depicted as individual units for ease of understanding of the details provided in this disclosure regarding the control system 48, it should be understood that the described functions of any of the individually depicted components, and particularly each of the depicted control devices, may be undertaken, for example, by one or more processors 104 connected to, and in communication with, one or more data storage device(s) 106.

Those skilled in the art will appreciate that other embodiments of the disclosed subject matter may be practiced with many types of image forming elements common to AM systems in many different configurations. It should be understood that these are non-limiting examples of the variations that may be undertaken according to the disclosed schemes. In other words, no particular limiting configuration is to be implied from the above description and the accompanying drawings.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A method for selectively patterning a dense sinterable additive manufactured feedstock structure into a 3D part with a 3D printing system, the method comprising:
   a) forwarding a web sheet having a layer of dense feedstock in a process direction with a transfer subsystem of a printing system, the feedstock being a dense sinterable material and binder composite with porosity below 20% volume, the web sheet sectioned into dense feedstock 3D slices having slice boundary sections therebetween, the slices having an imaging area thereon;
   b) selectively depositing a sintering ink according to a 3D pattern onto the imaging area of one of the dense feedstock 3D slices, the sintering ink infiltrating into the dense feedstock 3D slices to form patterned dense feedstock slices in accordance with the 3D pattern;
   c) stacking the patterned dense feedstock slices over a previously formed patterned dense feedstock slice to form a build monolith having a plurality of patterned dense feedstock slices;
   d) removing at least some of the binder composite from the build monolith; and
   e) sintering the build monolith into the 3D part shaped based on the 3D pattern.

2. The method of claim 1, further comprising, before step c), cutting the layer of dense feedstock at the slice boundary sections into the dense feedstock slices.

3. The method of claim 2, the cutting at the slice boundary sections segregating the dense feedstock slices into separate dense feedstock slices.

4. The method of claim 1, the step c) stacking including folding the individual patterned dense feedstock slices along the weekend sections on top of a build support to build the monolith.

5. The method of claim 1, further comprising, before step a), depositing the layer of dense feedstock onto a substrate to form the web sheet, the substrate being a support non-integral to the 3D part.

6. The method of claim 5, wherein the depositing includes depositing at least one of a metal powder and a ceramic powder that forms the layer of dense feedstock.

7. The method of claim 5, wherein the depositing the layer of dense feedstock includes depositing a powder including one of metal and ceramic, and depositing a binder to make a cohesive feedstock sheet.

8. The method of claim 7, wherein the binder includes a polymer, and step d) includes removing binder from the build monolith via one of solvent debind and thermal debind.

9. The method of claim 5, further comprising, before Step c), removing the substrate from the patterned dense feedstock slices.

10. The method of claim 1, further comprising surface finishing the 3D part.

11. The method of claim 1, further comprising, after step a), priming the layer of dense feedstock for compatibility with the sintering ink, the priming including one of applying heat to ablate/evaporate/transform the binder in areas where the sintering ink is to penetrate, applying an oxygen plasma or ion bombardment to make the binder more hydrophilic, and applying a solvent-based ink formulation to dissolve the binder in areas where the sintering ink is to penetrate.

12. The method of claim 1, wherein in step b) the selectively depositing is carried out through a pattern-wise process or by coating onto a selectively primed surface, and by spraying, screen printing, digital printing, inkjet printing, or offset printing the sintering ink.

13. The method of claim 1, wherein the sintering ink includes one of a sintering inhibitor to be deposited on the negative space or boundary of the pattern, and a sintering promoter to be deposited in the positive space of the pattern.

14. The method of claim 1, after step b), further comprising activating the sintering ink to transform the active selective-sintering material in the sintering ink from a state that is easily carried by the sintering ink as a solution or emulsion, to a state that doesn't leach out or diffuse after deposition, the activating including applying heat or gas flow to dry the sintering ink and leave a solid residue of the active material or applying heat, UV, or an energy source to cause a chemical reaction or decomposition reaction to transform a precursor in the sintering ink into a fully-functioning sintering inhibitor, or sintering-selectivity agent.

15. The method of claim 1, wherein the sintered 3D part has low anisotropy having differences in material properties being below about 20% in the process direction in comparison to an orthogonal direction.

16. The method of claim 1, wherein the Step c) further comprises bonding the plurality of patterned dense feedstock slices by applying at least one of heat and pressure to the stacked patterned dense feedstock slices.

17. The method of claim 16, wherein the Step c) bonding occurs via interaction of the binder composite in adjacent ones of the stacked patterned dense feedstock slices.

18. A method for selectively patterning a dense sinterable additive manufactured feedstock structure into a 3D part with a 3D printing system, the method comprising:
  a) forwarding a web sheet having a layer of dense feedstock in a process direction with a transfer subsystem of a printing system, the feedstock being a dense sinterable material and binder composite with porosity below 20% volume, the layer of dense feedstock being a dense feedstock 3D slice having imaging areas thereon;
  b) selectively depositing a sintering ink according to a 3D pattern onto the imaging areas of the dense feedstock 3D slice, the sintering ink infiltrating into the dense feedstock 3D slice to form a patterned dense feedstock slice in accordance with the 3D pattern;
  c) winding the patterned dense feedstock slice over a previously formed patterned dense feedstock slice section to form a build monolith;
  d) removing at least some of the binder composite from the build monolith; and
  e) sintering the build monolith into the 3D part shaped based on the 3D pattern.

19. The method of claim 18, further comprising, before step c), winding the previously formed patterned dense feedstock slice section over an axial support.

20. The method of claim 18, further comprising, before step a), depositing the layer of dense feedstock onto a substrate to form the web sheet, and before Step c), removing the substrate from the patterned dense feedstock slice.

21. A method for selectively patterning a dense sinterable additive manufactured feedstock structure into a 3D part with a 3D printing system, the method comprising:
  a) forwarding a plurality of web sheets including a plurality of dense feedstock 3D slices in a process direction with a transfer subsystem of a printing system, the 3D slices including feedstock having a dense sinterable material and binder composite with porosity below 20% volume, the 3D slices having an imaging area thereon;
  b) selectively depositing a sintering ink according to a 3D pattern onto the imaging area of the dense feedstock 3D slices, the sintering ink infiltrating into the dense feedstock 3D slices to form patterned dense feedstock slices in accordance with the 3D pattern;
  c) stacking the patterned dense feedstock slices over a previously formed patterned dense feedstock slice to form a build monolith of the patterned dense feedstock slices;
  d) removing at least some of the binder composite from the build monolith; and
  e) sintering the build monolith into the 3D part shaped based on the 3D pattern.

22. The method of claim 21, the web sheets having a substrate under the dense feedstock 3D slices, the method further comprising, before Step c), removing the substrate from the patterned dense feedstock slices.

* * * * *